United States Patent
Olson et al.

(10) Patent No.: US 12,521,020 B2
(45) Date of Patent: Jan. 13, 2026

(54) EAR-WEARABLE ELECTRONIC DEVICE INCLUDING IN-CANAL TEMPERATURE SENSOR

(71) Applicant: STARKEY LABORATORIES, INC., Eden Prairie, MN (US)

(72) Inventors: Kyle Olson, St. Louis Park, MN (US); Michael Karl Sacha, Chanhassen, MN (US); Peter Flanagan, Minneapolis, MN (US); Andy S. Lin, Chanhassen, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 695 days.

(21) Appl. No.: 17/890,735

(22) Filed: Aug. 18, 2022

(65) Prior Publication Data

US 2023/0068534 A1 Mar. 2, 2023

Related U.S. Application Data

(60) Provisional application No. 63/238,939, filed on Aug. 31, 2021.

(51) Int. Cl.
*A61B 5/00* (2006.01)
*A61B 5/01* (2006.01)
(Continued)

(52) U.S. Cl.
CPC .............. *A61B 5/01* (2013.01); *A61B 5/0008* (2013.01); *H04R 1/1016* (2013.01);
(Continued)

(58) Field of Classification Search
CPC . A61B 5/01; A61B 5/0008; A61B 2560/0425; A61B 2562/0271;
(Continued)

(56) References Cited

U.S. PATENT DOCUMENTS 4,895,164 A * 1/1990 Wood .................. G01J 5/04
374/126
5,469,855 A 11/1995 Pompei et al.
(Continued)

FOREIGN PATENT DOCUMENTS

EP 3576434 12/2019
JP 2009232298 A 10/2009
(Continued)

OTHER PUBLICATIONS

Hearables Body Temperature Monitor Flex PCB Strip Reference Design, TIDA-060034, Texas Instruments.
(Continued)

*Primary Examiner* — May A Abouelela
(74) *Attorney, Agent, or Firm* — Mueting Raasch Group

(57) ABSTRACT

Embodiments are directed to an electronic device configured to measure temperature from within an ear canal having a first bend, a second bend, and a tympanic membrane. The device comprises an enclosure comprising an in-canal section dimensioned for deployment in the ear canal. The in-canal section comprises a trough extending axially along at least a portion of the in-canal section and arranged to be positioned between the first bend and the tympanic membrane when the in-canal section is fully deployed in the ear canal. A temperature sensor is disposed in the trough. The temperature sensor comprises a flexible circuit board, a distal temperature sensor disposed on the flexible circuit board, and a proximal temperature sensor disposed on the flexible circuit board and situated proximal of, and spaced apart from, the distal temperature sensor in an outer ear direction.

24 Claims, 11 Drawing Sheets

(51) Int. Cl.
 *H04R 1/10* (2006.01)
 *H04R 25/00* (2006.01)
(52) U.S. Cl.
 CPC ......... *H04R 1/1091* (2013.01); *H04R 25/609* (2019.05); *H04R 1/105* (2013.01); *H04R 25/65* (2013.01); *H04R 2225/55* (2013.01)
(58) Field of Classification Search
 CPC ............ A61B 2562/043; A61B 5/6817; H04R 1/1016; H04R 1/1091; H04R 25/609; H04R 1/105; H04R 25/65; H04R 2225/55; G01K 7/427; G01K 13/20
 See application file for complete search history.

(56) References Cited

U.S. PATENT DOCUMENTS

| | | | |
|---|---|---|---|
| 5,673,692 A | 10/1997 | Schulze et al. | |
| 6,292,685 B1* | 9/2001 | Pompei | G01J 5/0025 600/475 |
| 6,556,852 B1* | 4/2003 | Schulze | A61B 5/01 600/323 |
| 7,660,426 B2 | 2/2010 | Hannibal et al. | |
| 8,306,774 B2 | 11/2012 | Quinn et al. | |
| 8,652,040 B2* | 2/2014 | LeBoeuf | A61B 5/1118 600/301 |
| 9,138,189 B1* | 9/2015 | Payne | A61B 5/74 |
| 9,288,584 B2 | 3/2016 | Hansen et al. | |
| 9,439,009 B2 | 9/2016 | Kim et al. | |
| 9,635,469 B2 | 4/2017 | Lunner et al. | |
| 9,723,415 B2 | 8/2017 | Gran et al. | |
| 9,838,771 B1* | 12/2017 | Masaki | G01R 33/072 |
| 10,219,063 B1* | 2/2019 | Valenzuela | H04R 25/554 |
| 10,455,337 B2 | 10/2019 | Yoo | |
| 10,567,891 B1* | 2/2020 | Stewart | H04R 25/65 |
| 10,779,090 B2 | 9/2020 | Larsen et al. | |
| 11,115,764 B2* | 9/2021 | Silberzahn | A61B 5/6826 |
| 11,125,622 B2* | 9/2021 | Marsh | G01J 5/12 |
| 2002/0035340 A1* | 3/2002 | Fraden | G01K 13/20 374/E13.002 |
| 2003/0016728 A1 | 1/2003 | Gerlitz | |
| 2003/0171655 A1* | 9/2003 | Newman | A61B 1/227 600/200 |
| 2005/0123146 A1 | 6/2005 | Voix et al. | |
| 2005/0209516 A1* | 9/2005 | Fraden | A61B 5/14552 600/323 |
| 2006/0045304 A1* | 3/2006 | Lee | H04R 1/1041 381/384 |
| 2006/0206014 A1* | 9/2006 | Ariav | A61B 5/01 374/E13.002 |
| 2008/0281169 A1* | 11/2008 | Akkermans | G01J 5/04 600/549 |
| 2009/0069645 A1* | 3/2009 | Nielsen | A61B 5/6817 600/301 |
| 2009/0221888 A1* | 9/2009 | Wijesiriwardana | G01K 13/20 600/324 |
| 2010/0211142 A1* | 8/2010 | Rogers | A61F 7/12 607/113 |
| 2011/0044483 A1 | 2/2011 | Edgar | |
| 2011/0058681 A1 | 3/2011 | Naylor | |
| 2012/0203077 A1 | 8/2012 | He et al. | |
| 2013/0245488 A1* | 9/2013 | Quinn | G01J 5/021 600/549 |
| 2014/0321682 A1* | 10/2014 | Kofod-Hansen | H04R 25/30 381/315 |
| 2015/0182135 A1* | 7/2015 | Ma | G06F 1/163 600/323 |
| 2015/0215719 A1* | 7/2015 | Turgul | H04R 1/1091 381/58 |
| 2015/0230036 A1* | 8/2015 | Pedersen | H04R 25/305 381/330 |
| 2015/0335466 A1* | 11/2015 | Schöggler | A61F 11/08 607/109 |
| 2016/0192050 A1* | 6/2016 | Masaki | H04R 1/1058 381/74 |
| 2016/0213354 A1* | 7/2016 | Levin | A61B 5/7275 |
| 2016/0296799 A1* | 10/2016 | Macagnano | A61B 5/6814 |
| 2016/0345903 A1* | 12/2016 | Bass | A61B 5/1114 |
| 2016/0373869 A1 | 12/2016 | Gran et al. | |
| 2017/0079586 A1* | 3/2017 | Geva | A61B 5/20 |
| 2017/0127193 A1 | 5/2017 | Husung | |
| 2017/0143198 A1* | 5/2017 | Xiao | A61B 1/07 |
| 2017/0258329 A1* | 9/2017 | Marsh | G01J 5/049 |
| 2017/0346920 A1* | 11/2017 | Masaki | G01P 15/003 |
| 2018/0035947 A1* | 2/2018 | Paetsch | A61B 5/6817 |
| 2018/0042496 A1* | 2/2018 | Lachhman | A61B 5/742 |
| 2018/0103850 A1* | 4/2018 | Tanaka | G01K 13/223 |
| 2018/0228435 A1* | 8/2018 | LeBoeuf | A61B 5/6817 |
| 2018/0338687 A1* | 11/2018 | Kashiwase | A61B 5/01 |
| 2018/0368718 A1* | 12/2018 | Koziol | A61B 5/6815 |
| 2019/0069098 A1* | 2/2019 | Walsh | H04R 25/505 |
| 2019/0110692 A1 | 4/2019 | Pardey et al. | |
| 2019/0117155 A1 | 4/2019 | Cross et al. | |
| 2019/0216395 A1* | 7/2019 | Geva | A61B 5/02438 |
| 2019/0253793 A1* | 8/2019 | Pedersen | H04R 25/60 |
| 2019/0268707 A1* | 8/2019 | Solum | G06F 3/017 |
| 2019/0380597 A1* | 12/2019 | Howard | A61B 5/318 |
| 2020/0219506 A1* | 7/2020 | Bhowmik | G10L 15/08 |
| 2020/0245057 A1* | 7/2020 | Igarashi | H04R 3/04 |
| 2020/0268260 A1* | 8/2020 | Tran | A61B 1/00194 |
| 2020/0296524 A1 | 9/2020 | Troelsen et al. | |
| 2020/0413178 A1* | 12/2020 | Kreuzer | H04R 1/1066 |
| 2021/0022615 A1* | 1/2021 | Greer | G08B 21/182 |
| 2021/0045638 A1* | 2/2021 | McDuffie | G01J 5/0025 |
| 2021/0064897 A1* | 3/2021 | Cerfolio | G06V 40/70 |
| 2021/0067863 A1* | 3/2021 | Shinmen | H04R 1/1008 |
| 2021/0085193 A1* | 3/2021 | Iegaki | A61B 5/01 |
| 2021/0108965 A1* | 4/2021 | Wang | A61B 5/6817 |
| 2021/0330192 A1* | 10/2021 | Tanaka | G01J 5/0205 |
| 2021/0381898 A1* | 12/2021 | Tanaka | A61B 5/6817 |
| 2021/0393138 A1* | 12/2021 | Jung | A61B 5/6844 |
| 2022/0082456 A1* | 3/2022 | Rowland | G02C 11/10 |
| 2022/0142575 A1* | 5/2022 | Kreuzer | A61B 5/02427 |
| 2023/0179901 A1* | 6/2023 | O'Callaghan | H04R 25/48 381/311 |
| 2023/0240541 A1* | 8/2023 | Low | A61B 5/7275 600/301 |
| 2023/0301580 A1* | 9/2023 | Xiao | A61B 5/746 |
| 2024/0081753 A1* | 3/2024 | Andersen | A61B 5/0816 |
| 2024/0142309 A1* | 5/2024 | Li | H04R 1/1075 |

FOREIGN PATENT DOCUMENTS

| | | |
|---|---|---|
| WO | WO 2006091106 A1 | 8/2006 |
| WO | WO 201204278 A1 | 4/2012 |

OTHER PUBLICATIONS

Cross et al., "A Thermistor Based System for Obtaining Temperature from Inside the Ear," IEEE, 6 pages.

International Patent Application No. PCT/US2021/045485, filed Aug. 11, 2021; International Search Report / Written Opinion issued Mar. 31, 2022; 18 pages.

* cited by examiner

*Figure 4C*
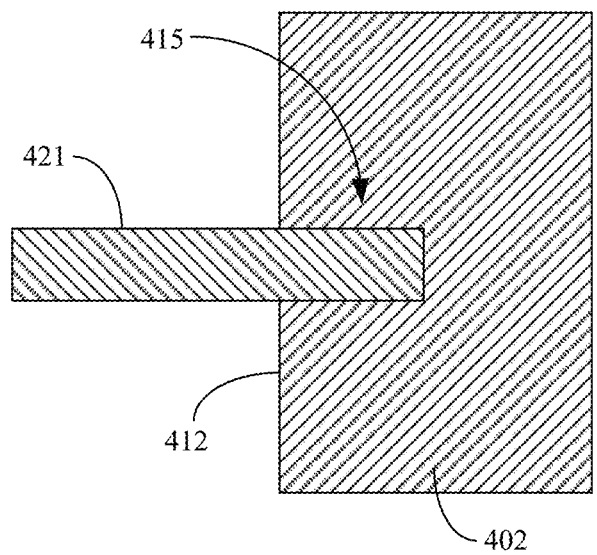
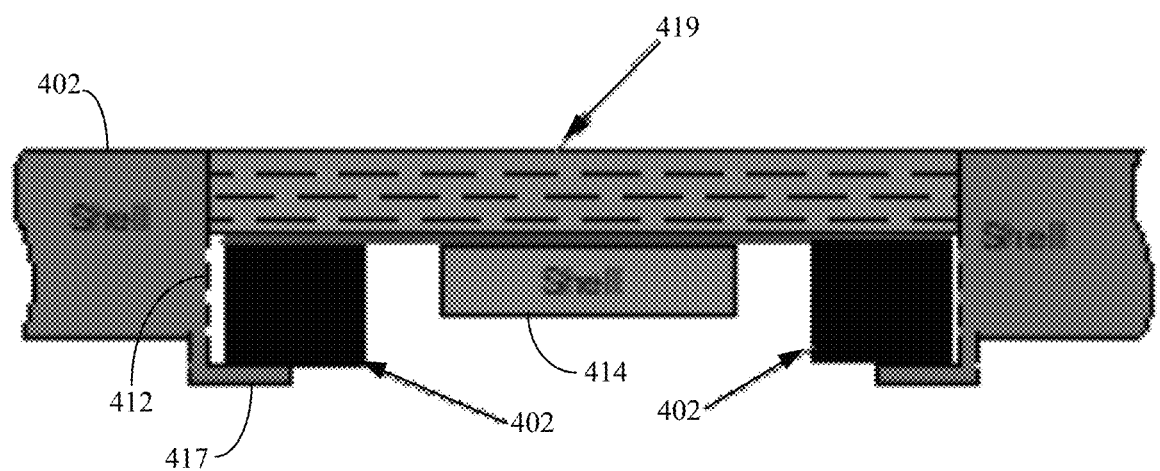
*Figure 4D*

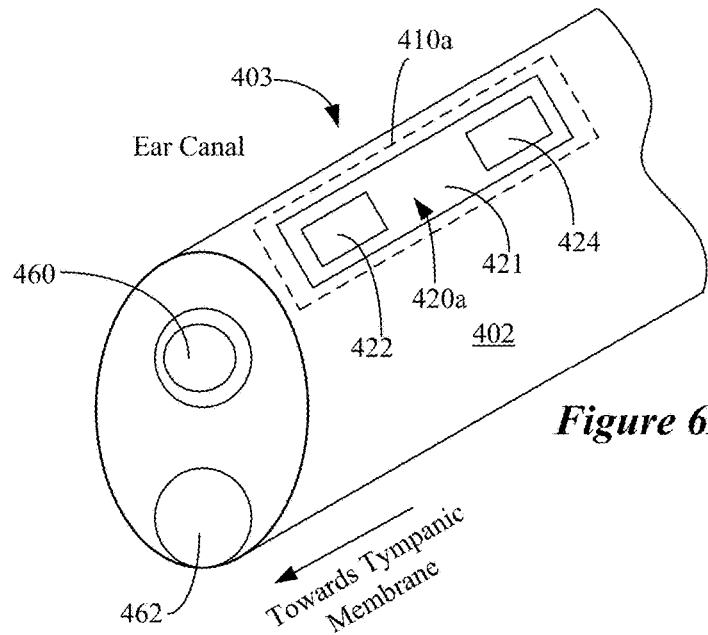
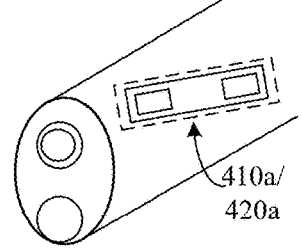
*Figure 6A*
*Figure 6A-1*
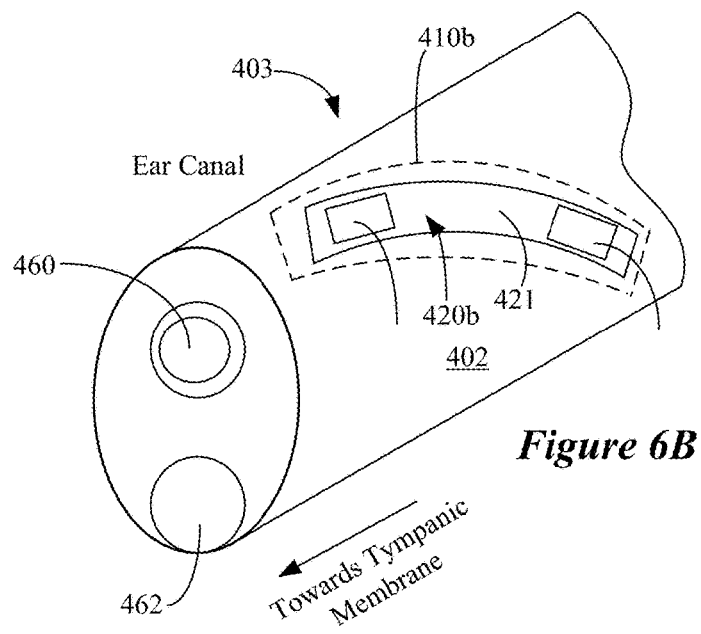
*Figure 6B*
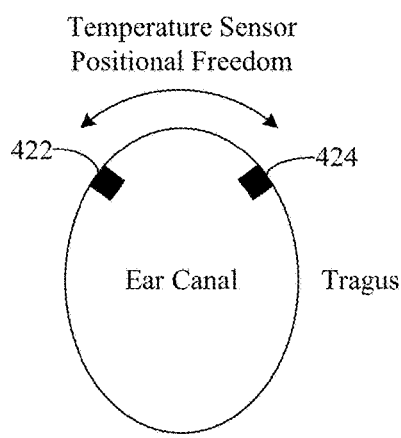
*Figure 6C*

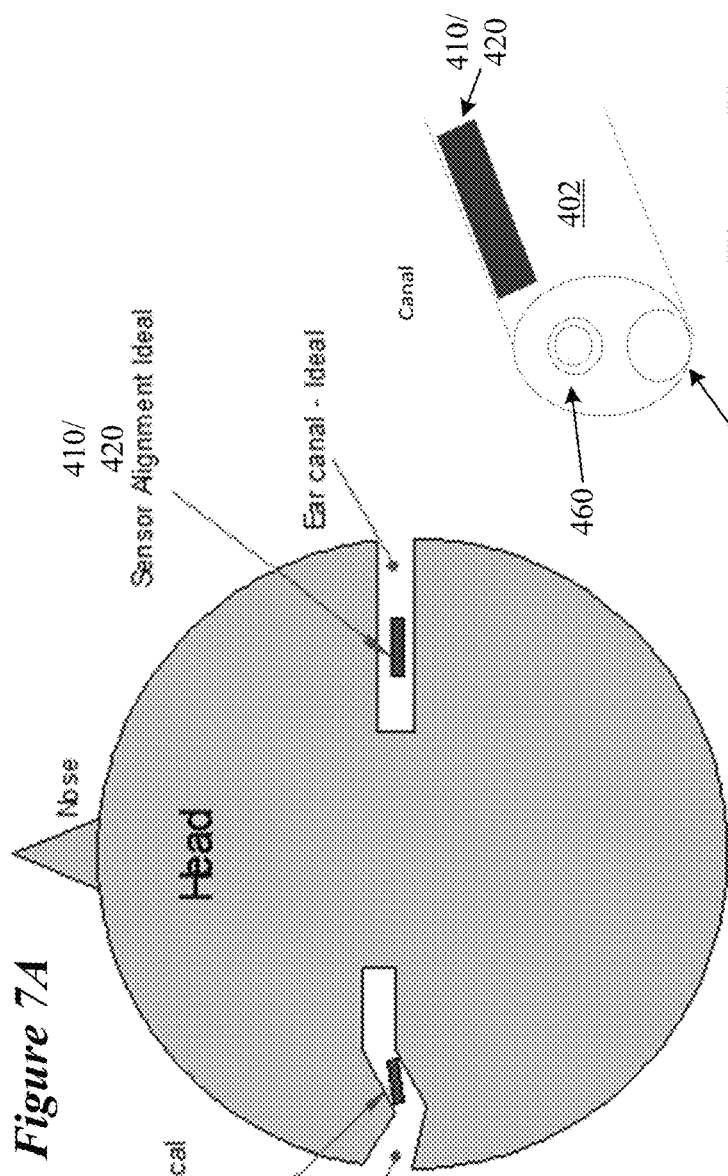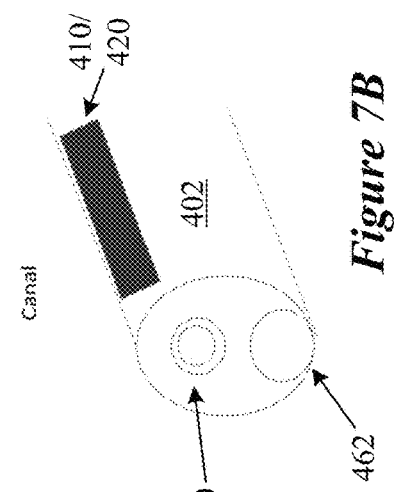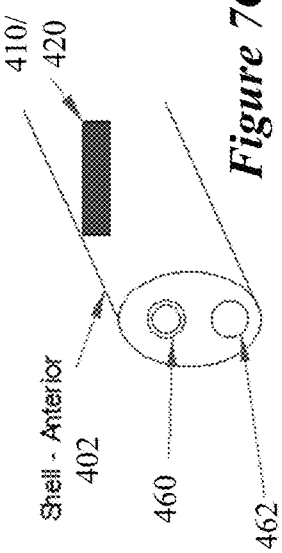
*Figure 7A*
*Figure 7B*
*Figure 7C*

EAR-WEARABLE ELECTRONIC DEVICE INCLUDING IN-CANAL TEMPERATURE SENSOR

RELATED APPLICATIONS

This application claims the benefit of U.S. Provisional Application No. 63/238,939, filed Aug. 31, 2021, the entire content of each of which is hereby incorporated by reference.

TECHNICAL FIELD

This application relates generally to devices and sensing methods for measuring core body temperature from within an ear canal, such devices including ear-wearable electronic devices, hearing aid, hearables, earbuds, personal amplification devices, and physiologic/biometric monitoring device.

BACKGROUND

Measuring core body temperature and changes in core body temperature is key to assessing various health conditions. One area of the body that can be used to capture accurate temperature measurements is the ear. Measuring temperature from the ear is typically accomplished using a handheld IR sensor. The primary challenge with acquiring accurate in-ear temperature measurements using a handheld IR sensor is obtaining a direct field of view from the measurement sensor to the tympanic membrane through a narrow and often angular ear canal.

SUMMARY

Embodiments are directed to an electronic device configured to measure temperature from within an ear canal having a first bend, a second bend, and a tympanic membrane. The device comprises an enclosure comprising an in-canal section dimensioned for deployment in the ear canal. The in-canal section comprises a trough extending axially along at least a portion of the in-canal section and arranged to be positioned between the first bend and the tympanic membrane when the in-canal section is fully deployed in the ear canal. A temperature sensor is disposed in the trough. The temperature sensor comprises a flexible circuit board, a distal temperature sensor disposed on the flexible circuit board, and a proximal temperature sensor disposed on the flexible circuit board and situated proximal of, and spaced apart from, the distal temperature sensor in an outer ear direction.

Embodiments are directed to a method implemented by an ear-wearable electronic device configured for deployment in an ear canal of an ear, the ear canal comprising a first bend, a second bend, and a tympanic membrane. The method comprises measuring, using a distal temperature sensor disposed in a trough of an enclosure of the device, a first temperature indicative of one or both of conductive heat and convective heat at a first location of the ear canal between the first bend and the tympanic membrane. The method also comprises measuring, using a proximal temperature sensor disposed in the trough at a location proximal of the distal temperature sensor in an outer ear direction, a second temperature indicative of one or both of conductive heat and convective heat at a second location of the ear canal between the first and second bends. The method further comprises receiving, from a memory of the device, a pre-established heat balance equation, and calculating, using a processor of the device, a core body temperature using the pre-established heat balance equation and the first and second temperatures.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein:

FIG. 4C shows a structure for supporting a temperature sensor arrangement in a trough of an ear-wearable electronic device in accordance with any of the embodiments disclosed herein;

FIG. 4D is a cross-sectional view of a portion of an electronic device configured to measure temperature from within an ear canal in accordance with any of the embodiments disclosed herein;

FIG. 6A illustrates a configuration of a trough and a temperature sensor disposed in the trough in accordance with any of the embodiments disclosed herein;

FIG. 6A-1 shows a variation of the trough/temperature sensor orientation illustrated in FIG. 6A;

FIG. 6B illustrates a configuration of a trough and a temperature sensor disposed in the trough in accordance with any of the embodiments disclosed herein;

FIG. 6C illustrates positional freedom of distal and proximal temperature sensors relative to skin tissue of the ear canal in accordance with any of the embodiments disclosed herein;

FIG. 7A illustrates an ideal ear canal (right side), a typical ear canal (left side), and temperature sensor/trough orientations for each type of ear canal in accordance with any of the embodiments disclosed herein;

FIG. 7B illustrates a temperature sensor/trough orientation for the ideal ear canal (right side) shown in FIG. 7A;

FIG. 7C illustrates a temperature sensor/trough orientation for the typical ear canal (left side) shown in FIG. 7A.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
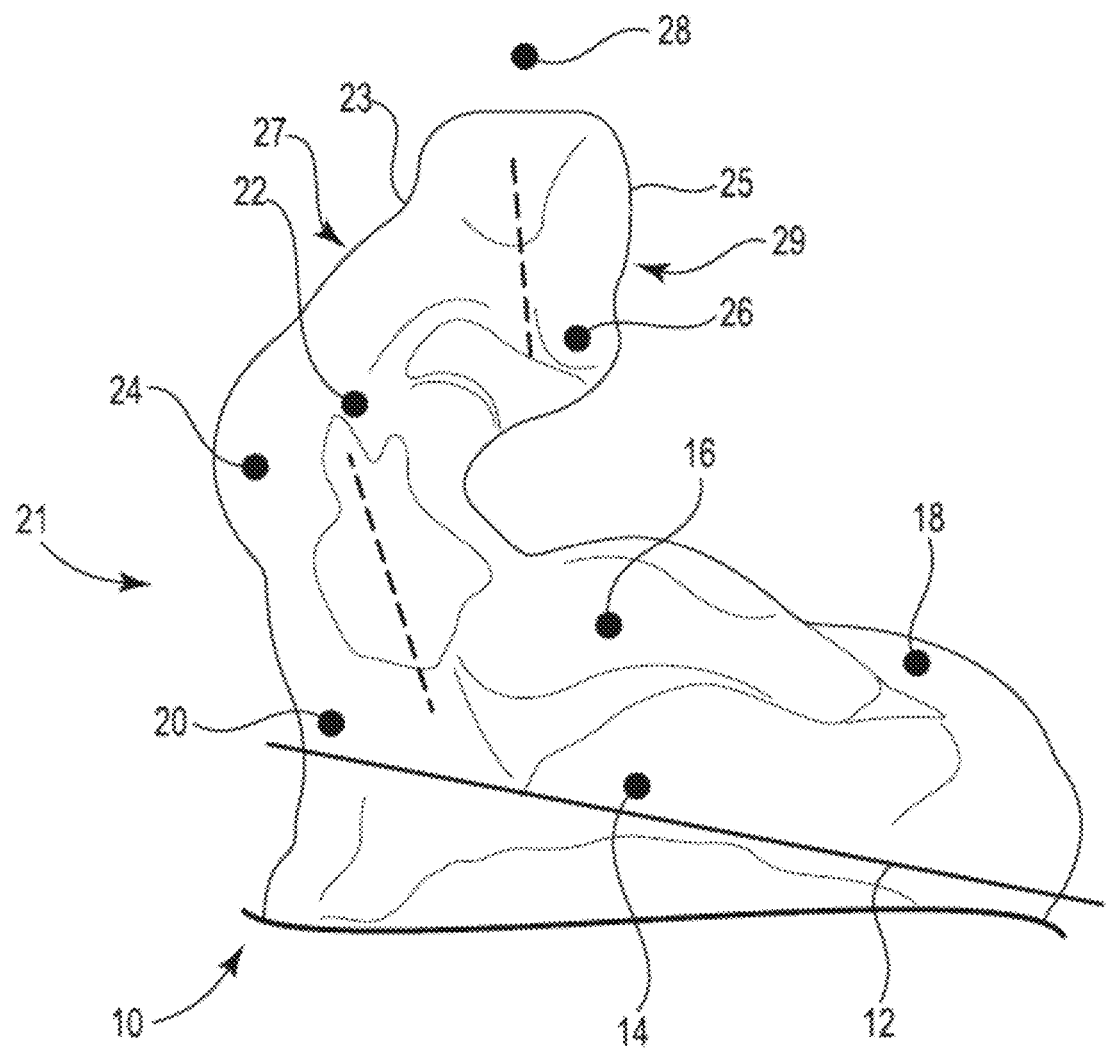
FIG. 1 is an illustration of a person's ear including various anatomical features.

Valuable health information can be derived from measurement of human body temperature. Core body temperature has been used as a key vital sign to detect fever and infection. Continuous measurement of core body temperature provides valuable information about a person's health status. For example, the change in temperature can be monitored as a health indicator, to prevent heat stress during endurance activity or exposure to extreme temperatures, or detect decreases in body temperature due to hypoglycemia or diabetes. In addition, changes in the circadian rhythm of temperature occur in aging, diabetes, and persons with altered sleep cycles. By measuring these changes, it may be possible to obtain valuable information about transitions from health to disease states leading to the discovery of preventive methods and better disease management protocols.

Temperature sensing (e.g., continuous temperature sensing) from an ear-wearable electronic device presents many size and power constraints. The inventors have realized that a problem to be solved in the art includes the ability to obtain continuous/repetitive and accurate core body temperate measurements and changes in temperature measurements from devices that can be inserted into and/or worn on or in the ear. In the present disclosure, several apparatuses and methods for continuously or repetitively measuring temperature from various ear-wearable are described. The various apparatuses and methods disclosed herein involve using at least two temperatures sensors situated in a trough of an in-canal section of an ear-wearable electronic device enclosure (e.g., housing, shell). The trough defines a recesses or thinned portion of the in-canal section of the ear-wearable electronic device enclosure.

According to any of the embodiments disclosed herein, at least two thermistors are situated in a trough provided in the in-canal section of an ear-wearable electronic device enclosure. For example, two thermistors disposed on a flexible printed circuit board (flexible PCB) can be mounted in the trough of the in-canal section of the ear-wearable electronic device enclosure. The flexible PCB (which may alternatively be rigid or semi-rigid) mounted at the bottom of the trough is configured to fix the distance between the two thermistors according to a predetermined spacing specification. The trough advantageously provides for a reduced thermal path (e.g., reduced thermal resistance) between the thermistors and tissue of the ear canal. Thermistors (e.g., thermistor contact-sensors) offer low cost, low power solutions which enable a continuously-worn ear device. The thermistor-based temperature sensor can be used to measure body temperature or trend of body temperature from an ear-wearable electronic device on a continuous basis.

According to any of the embodiments disclosed herein, the trough defines a recessed or thinned section of the in-canal section of an ear-wearable electronic device enclosure. In accordance with any of the embodiments disclosed herein, the trough defines an inner recessed section provided along an inner surface of the in-canal section of the ear-wearable electronic device enclosure. According to any of the embodiments disclosed herein, the trough defines an outer recessed section provided along an outer surface of the in-canal section of the ear-wearable electronic device enclosure. In accordance with any of the embodiments disclosed herein, the trough defines a co-located recessed section provided along an inner surface and an outer surface of the in-canal section of the ear-wearable electronic device enclosure. For those embodiments having an outer recessed section, after installing the flexible PCB and thermistors into the trough, a cover material (e.g., a bio-compatible sealant) can be dispensed into the outer recessed section provided along an outer surface of the in-canal section to cover the flexible PCB and thermistors.

Embodiments of the disclosure are defined in the claims. However, below there is provided a non-exhaustive listing of non-limiting examples. Any one or more of the features of these examples may be combined with any one or more features of another example, embodiment, or aspect described herein.

Example Ex1. An electronic device configured to measure temperature from within an ear canal having a first bend, a second bend, and a tympanic membrane. The device comprises an enclosure comprising an in-canal section dimensioned for deployment in the ear canal, the in-canal section comprising a trough extending axially along at least a portion of the in-canal section and arranged to be positioned between the first bend and the tympanic membrane when the in-canal section is fully deployed in the ear canal. A temperature sensor is disposed in the trough and comprises a flexible circuit board, a distal temperature sensor disposed on the flexible circuit board, and a proximal temperature sensor disposed on the flexible circuit board and situated proximal of, and spaced apart from, the distal temperature sensor in an outer ear direction.

Example Ex2. The device according to Ex1, wherein each of the distal and proximal temperature sensors is situated between the first bend and the second bend when the in-canal section is fully deployed in the ear canal.

Example Ex3. The device according to Ex1, wherein the distal temperature sensor is situated between the second bend and the tympanic membrane when the in-canal section is fully deployed in the ear canal, and the proximal temperature sensor is situated between the first bend and the second bend when the in-canal section is fully deployed in the ear canal.

Example Ex4. The device according to one or more of Ex1 to Ex3, wherein a wall of the in-canal section comprises an outer surface having a unique shape that uniquely conforms to a geometry of the wearer's ear canal, and the trough defines a recess in the outer surface.

Example Ex5. The device according to one or more of Ex1 to Ex4, comprising one or more of notches, slots, and ledges provided at opposing sides of the trough and configured to support the temperature sensor within the trough.

Example Ex6. The device according to one or more of Ex1 to Ex5, wherein a wall of the in-canal section comprises an outer surface configured to contact tissue of the ear canal and an inner surface opposing the outer surface, the flexible circuit board comprises a first surface oriented toward the outer surface and a second surface oriented toward the inner surface, and the distal and proximal temperature sensors are mounted to the second surface of the flexible circuit board.

Example Ex7. The device of Ex6, wherein the trough comprises a bridge section configured to support the flexible circuit board.

Example Ex8. The device according to one or more of Ex1 to Ex7, wherein material covers the temperature sensor and fills the trough.

Example Ex9. The device of one or more of Ex1 to Ex8, wherein the trough defines a substantially straight recessed portion of the in-canal section, such that the distal and proximal temperature sensors are axially aligned relative to a longitudinal axis of the in-canal section.

Example Ex10. The device of one or more of Ex1 to Ex8, wherein the in-canal section has a longitudinal axis, and the trough and the temperature sensor are oriented at an angle relative to the longitudinal axis.

Example Ex11. The device of one or more of Ex1 to Ex8, wherein the trough defines at least a partially curved recessed portion of the in-canal section, such that the distal and proximal temperature sensors are radially offset relative to one another.

Example Ex12. The device of one or more of Ex1 to Ex11, wherein the distal and proximal temperature sensors are positioned in the trough such that the distal and proximal temperature sensors are situated at a superior position in the ear canal when the in-canal section is fully deployed in the ear canal, or the distal and proximal temperature sensors are positioned in the trough such that the distal and proximal temperature sensors are situated at an anterior position in the ear canal when the in-canal section is fully deployed in the ear canal, or the distal temperature sensor is positioned in the trough such that the distal temperature sensor is situated at a superior position in the ear canal when the in-canal section is fully deployed in the ear canal, and the proximal temperature sensor is positioned in the trough such that the proximal temperature sensor is situated at an anterior position in the ear canal when the in-canal section is fully deployed in the ear canal.

Example Ex13. The device according to one or more of Ex1 to Ex12, wherein the distal temperature sensor is configured to sense one or both of conductive heat and convective heat and to produce a first temperature signal, and the proximal temperature sensor is configured to sense one or both of conductive heat and convective heat and to produce a second temperature signal.

Example Ex14. The device according to one or more of Ex1 to Ex13, wherein each of the distal and proximal temperature sensors is configured to thermally couple to tissue of the ear canal.

Example Ex15. The device according to one or more of Ex1 to Ex14, wherein the trough and the flexible circuit board are configured to positionally stabilize the distal and proximal temperature sensors so as to maintain a consistent spacing therebetween while the in-canal section is deployed in the ear-canal.

Example Ex16. The device according to Ex15, wherein the spacing ranges from about 2 mm to about 10 mm.

Example Ex17. The device according to Ex15, wherein the spacing ranges from about 6 mm to about 8 mm.

Example Ex18. The device according to one or more of Ex1 to Ex17, wherein the trough and the flexible circuit board are configured to stabilize a location of the distal and proximal temperature sensors in the ear canal and to facilitate consistent thermal contact with ear-canal tissue while deployed in the ear-canal.

Example Ex19. The device according to one or more of Ex1 to Ex18, wherein the flexible circuit board comprises conductive traces configured to provide electrical connectivity between each of the distal and proximal temperature sensors and other circuitry of the device.

Example Ex20. The device according to one or more of Ex1 to Ex19, comprising a processor operatively coupled to the temperature sensor, the processor configured to calculate a core body temperature using a pre-established heat balance equation and signals produced by the first and proximal temperature sensors.

Example Ex21. The device according to one or more of Ex1 to Ex20, comprising a processor operatively coupled to the temperature sensor, the processor configured to calculate a thermal gradient using signals produced by the first and proximal temperature sensors, and extrapolate a core body temperature using the thermal gradient.

Example Ex22. A method implemented by an ear-wearable electronic device configured for deployment in an ear canal of an ear, the ear canal comprising a first bend, a second bend, and a tympanic membrane, the method comprising measuring, using a distal temperature sensor disposed in a trough of an enclosure of the device, a first temperature indicative of one or both of conductive heat and convective heat at a first location of the ear canal between the first bend and the tympanic membrane, measuring, using a proximal temperature sensor disposed in the trough at a location proximal of the distal temperature sensor in an outer ear direction, a second temperature indicative of one or both of conductive heat and convective heat at a second location of the ear canal between the first and second bends, receiving, from a memory of the device, a pre-established heat balance equation, and calculating, using a processor of the device, a core body temperature using the pre-established heat balance equation and the first and second temperatures.

Example Ex23. The method of Ex22, wherein measuring the first temperature comprises measuring, using the distal temperature sensor, the first temperature indicative of one or both of conductive heat and convective heat at a first location of the ear canal between the second bend and the tympanic membrane.

Example Ex24. The method of Ex22, comprising performing the method according to Ex22 or Ex23 on a continuous basis.

FIG. 1 is an illustration of a person's ear 10 and, in particular, the ear canal 22. The ear 10 illustrated in FIG. 1 shows a number of anatomical features near the ear line 12, including the antitragus 14, concha 16, helix 18, and tragus 20. The ear canal 22 includes a proximal section 21 between the tragus 20 and a first bend 24 of the canal 22. A middle section 27 is shown between the first bend 24 and a second bend 26 of the canal 22. A distal section 29 is shown between the second bend 26 and a tympanic membrane (ear drum) 28.

Embodiments are directed to devices and methods that measure temperature of tissue within the ear canal 22, from which core body temperature can be calculated using a heat balance equation in accordance with any of the embodiments disclosed herein. Embodiments are directed to devices and methods that measure temperature at specified locations of the ear canal 22 using temperature sensors configured to sense conductive and/or convective heat, rather than radiative heat. For example, the specified locations from which temperature measurements are made can include a proximal location and a distal location each defined between the first and second bends of an ear canal. In another example, the specified locations from which temperature measurements are made can include a proximal location defined between the first and second bends of an ear canal and a distal location defined between the second bend of an ear canal and the tympanic membrane. In a further example, the specified locations from which temperature measurements are made can include a proximal location and a distal location each defined between the second bend of an ear canal and the tympanic membrane.

Figure 2A:
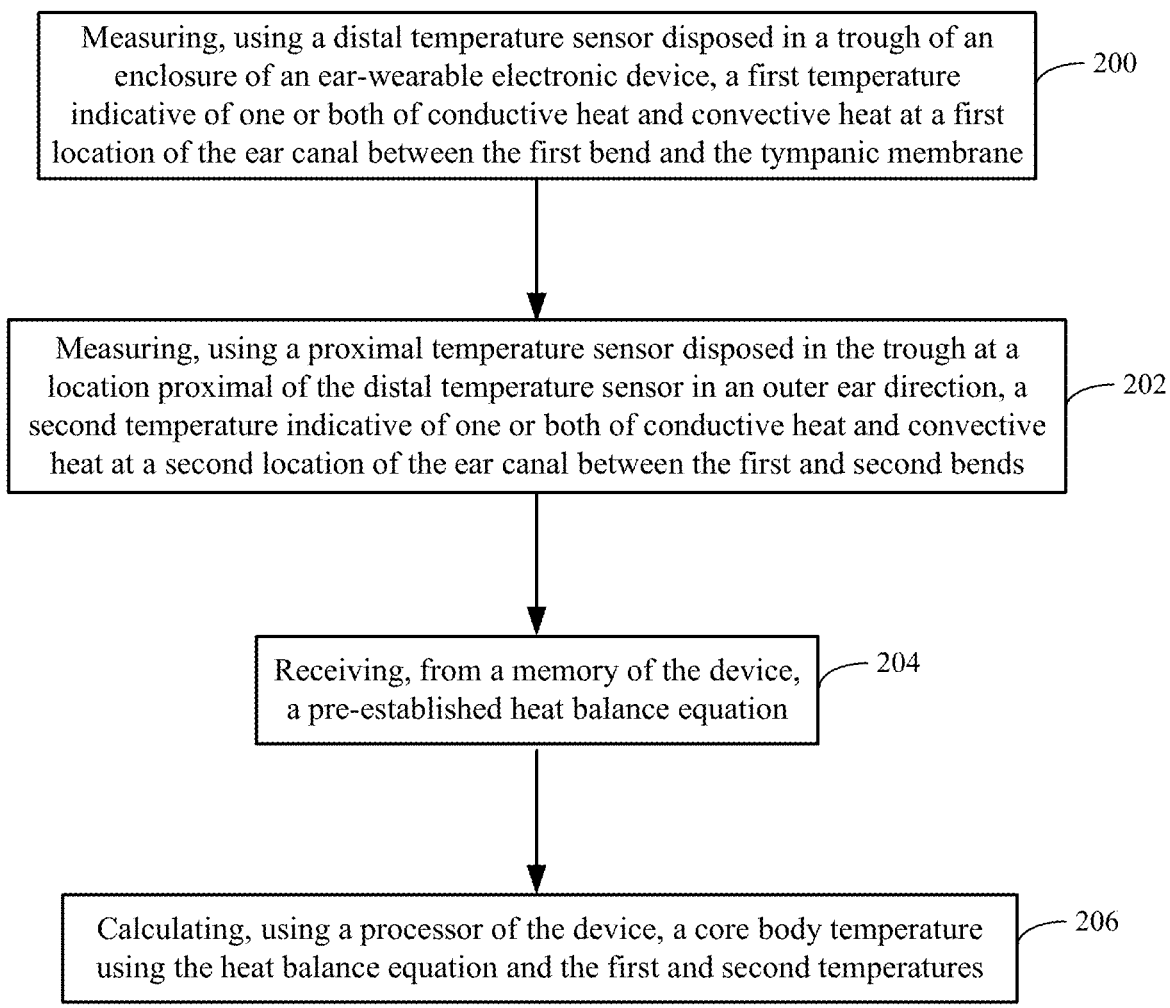
FIG. 2A is a method that can be implemented by devices described in the present disclosure in accordance with any of the embodiments disclosed herein.

FIG. 2A is a method that can be implemented by devices described in the present disclosure in accordance with any of the embodiments disclosed herein. The method shown in FIG. 2A can be implemented by an ear-wearable electronic device configured for deployment in an ear canal of an ear, where the ear canal comprises a first bend, a second bend, and a tympanic membrane. With continued reference to FIG. 1, the method shown in FIG. 2A involves measuring 200, using a distal temperature sensor disposed in a trough of an enclosure of the device, a first temperature indicative of one or both of conductive heat and convective heat (e.g., rather than radiative heat) at a first location of the ear canal between the first bend and the tympanic membrane (e.g., between the second bend and the tympanic membrane). The method also involves measuring 202, using a proximal temperature sensor disposed in the trough at a location proximal of the distal temperature sensor in an outer ear direction, a second temperature indicative of one or both of conductive heat and convective heat (e.g., rather than radiative heat) at a second location of the ear canal between the first and second bends. In smaller ears, the second location of the ear canal can be near (but not beyond) the first bend. For example, the proximal temperature sensor can be located proximal of, or at, the first bend (e.g., between the canal opening and the first bend).

The method further involves receiving 204, from a memory (e.g., of the device, a smartphone, a smartwatch, a cloud server), a pre-established heat balance equation. The method also involves calculating 206, using a processor (e.g., of the device, a smartphone, a smartwatch, a cloud server), a core body temperature using the heat balance equation and the first and second temperatures.

Figure 2B:
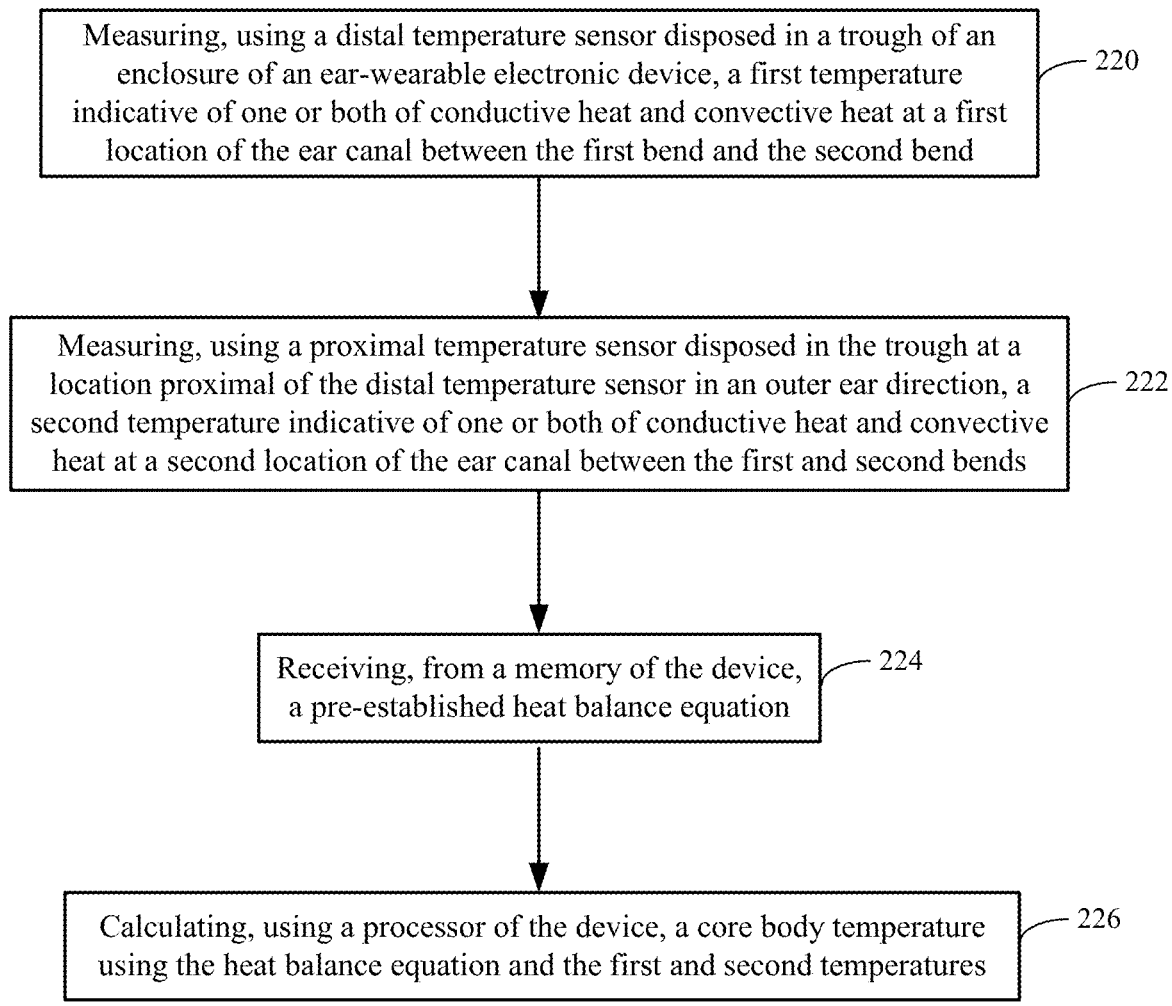
FIG. 2B is a method that can be implemented by devices described in the present disclosure in accordance with any of the embodiments disclosed herein.

FIG. 2B is a method that can be implemented by devices described in the present disclosure in accordance with any of the embodiments disclosed herein. The method shown in FIG. 2B can be implemented by an ear-wearable electronic device configured for deployment in an ear canal of an ear, where the ear canal comprises a first bend, a second bend, and a tympanic membrane. With continued reference to FIG. 1, the method shown in FIG. 2B involves measuring 220, using a distal temperature sensor disposed in a trough of an enclosure of the device, a first temperature indicative of one or both of conductive heat and convective heat (e.g., rather than radiative heat) at a first location of the ear canal between the first bend and the second bend. The method also involves measuring 222, using a proximal temperature sensor disposed in the trough at a location proximal of the distal temperature sensor in an outer ear direction, a second temperature indicative of one or both of conductive heat and convective heat (e.g., rather than radiative heat) at a second location of the ear canal between the first and second bends. The method further involves receiving 224, from a memory (e.g., of the device, a smartphone, a smartwatch, a cloud server), a pre-established heat balance equation. The method also involves calculating 226, using a processor (e.g., of the device, a smartphone, a smartwatch, a cloud server), a core body temperature using the heat balance equation and the first and second temperatures.

Figure 3:
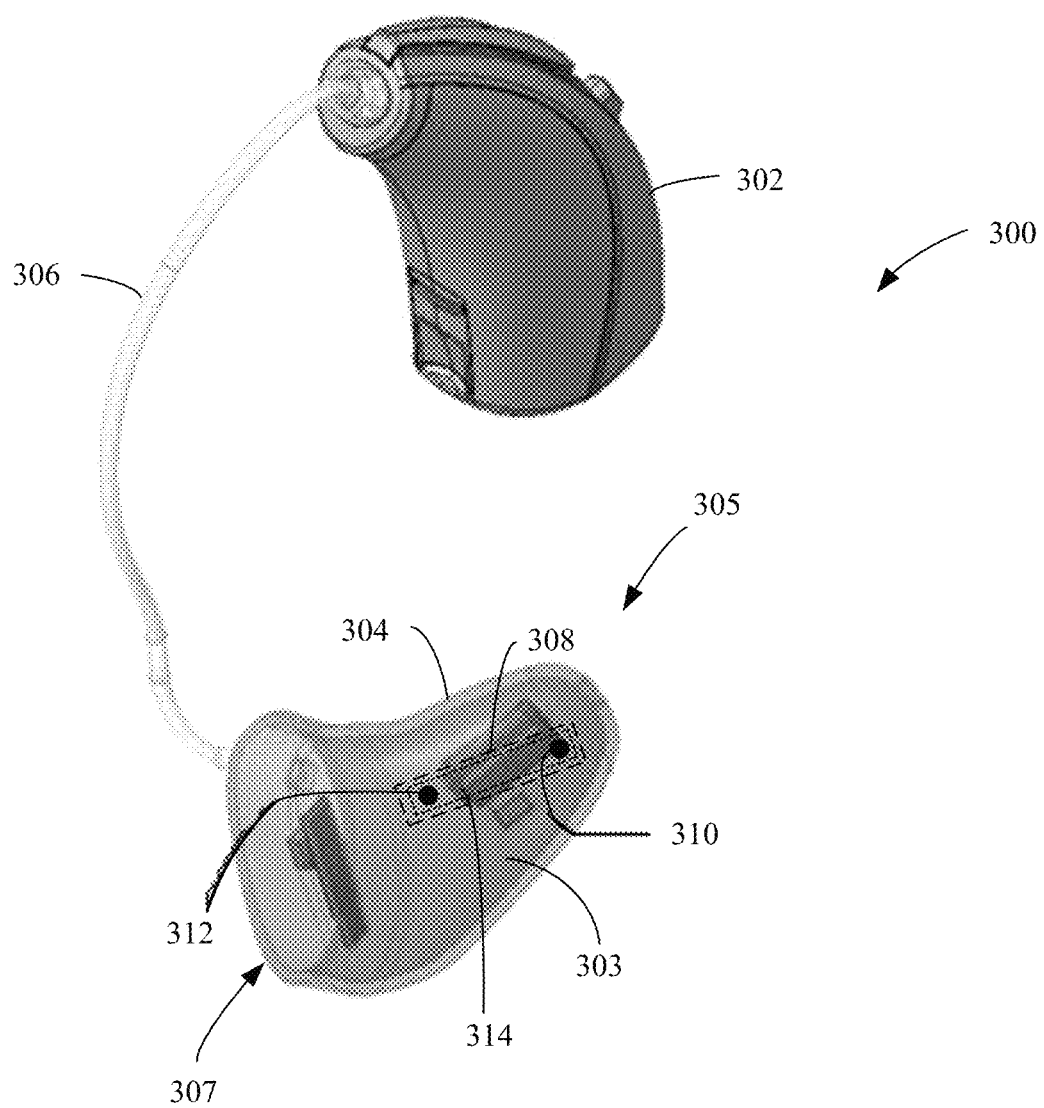
FIG. 3 shows a representative ear-wearable electronic device which includes an in-canal component having a trough and a temperature sensor arrangement disposed in the trough in accordance with any of the embodiments disclosed herein.

FIG. 3 shows a representative ear-wearable electronic device which include an in-canal component having a trough and a temperature sensor arrangement disposed in the trough in accordance with any of the embodiments disclosed herein. The ear-wearable electronic device 300, is configured as a custom RIC device, which includes a custom receiver 304 (molded to the wearer's ear canal) coupled to a behind-ear case 302 via a cable 306. The behind-ear case 302 is configured for positioning behind the ear of the wearer, and the receiver 304 is configured for positioning in the ear canal. The receiver 304 includes a loudspeaker, while other electronics are housed in the behind-ear case 302. It is understood that the in-canal component can be a stand-alone device or a device physically and/or communicatively coupled to another device (e.g., an outer-ear device, an on-ear device or a wearable device).

The receiver 304 includes an enclosure (e.g., a shell) configured for insertion into the ear canal and includes a distal temperature sensor 310 and a proximal temperature sensor 312. When deployed in the ear canal, the proximal temperature sensor 312 is directed more towards the outer ear relative to the distal end 305. In other words, and in the context of the following positioning examples, the distal temperature sensor 310 is closer to the tympanic membrane than the proximal temperature sensor 312 when the receiver 304 is deployed in the ear canal.

The receiver 304 includes a trough 308 provided in the enclosure (e.g., shell) 303 of the receiver 304. A temperature sensor arrangement is disposed in the trough and includes a proximal temperatures sensor 312 and a distal temperature sensor 310 each mounted to a flexible PCB 314. Electrical conductors of the cable 306 terminate at, and electrically connect to, electrical contacts of the flexible PCB 314. The flexible PCB 314 serves to electrically connect the proximal temperatures sensor 312 and the distal temperature sensor 310 to the cable 306 and, in some implementations, to other circuitry and components disposed on the flexible PCB 314 or elsewhere in/on the receiver 304 (e.g., signal processing circuitry, power management circuitry, physiologic sensors, non-physiologic sensors).

In some implementations, and with the receiver 304 deployed in the ear canal, the proximal temperature sensor 312 is configured to be positioned at or beyond the first bend and terminate prior to the second bend, and the distal temperature sensor 310 is configured to be positioned beyond the first bend and terminate at or prior to the second bend. In other implementations, and with the receiver 304 deployed in the ear canal, the proximal temperature sensor 312 is configured to be positioned at, near (in an outer ear direction) or beyond the first bend and terminate at or prior to the second bend (or terminate prior to the tympanic membrane in some implementations), and the distal temperature sensor 310 is configured to extend beyond the second bend and terminate prior to the tympanic membrane. In further implementations, and with the receiver 304 deployed in the ear canal, the proximal temperature sensor 312 is configured to be positioned at or beyond the second bend and terminate prior to the tympanic membrane, and the distal temperature sensor 310 is configured to be positioned beyond the second bend and terminate prior to the tympanic membrane. As discussed below, a core body temperature can be calculated by a processor or controller of the ear-wearable electronic device 300 using a heat balance equation and first and second temperature signals produced by the distal temperature sensor 310 and the proximal temperature sensor 312.

It is understood that other in-canal hearing devices (e.g., ITE, BTE, CIC, IIC devices) can be equipped with a proximal temperature sensor 312 and a distal temperature sensor 310 disposed in a trough 308 from which first and second temperature signals can be produced and used to calculate a core body temperature of the wearer of the ear-wearable electronic devices 300. It is also understood that the ear-wearable electronic devices 300 can be equipped with more than two temperature sensors (e.g., 3, 4, 5, or 6 temperatures sensors).

Figure 4A:
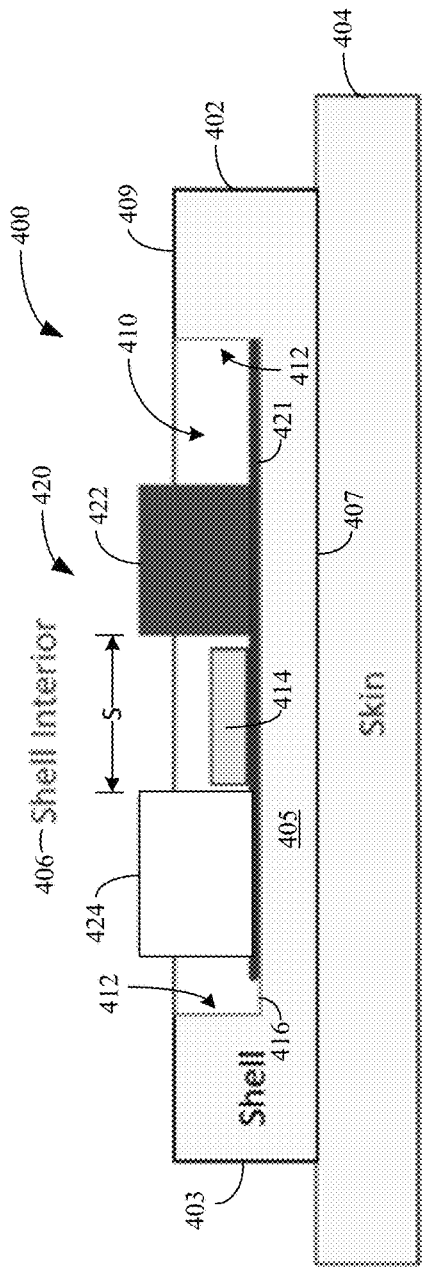
FIG. 4A is a cross-sectional view of a portion of an electronic device configured to measure temperature from within an ear canal in accordance with any of the embodiments disclosed herein.
Figure 4B:
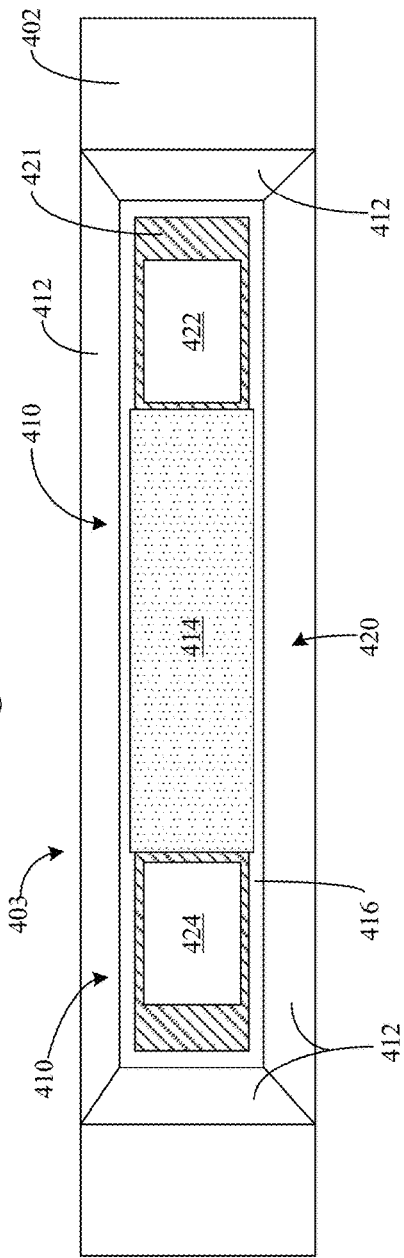
FIG. 4B is a top view of a portion of an electronic device configured to measure temperature from within an ear canal in accordance with any of the embodiments disclosed herein.

FIGS. 4A and 4B illustrate a portion of an ear-wearable electronic device 400 configured to measure temperature from within an ear canal in accordance with any of the embodiments disclosed herein. The ear canal comprises a first bend, a second bend, and a tympanic membrane, such as that shown in FIG. 1. The portion of the electronic device 400 includes an enclosure or shell 402 comprising an in-canal section 403 dimension for deployment in the ear canal. The in-canal section 403 comprises a trough 410 extending axially along at least a portion of the in-canal section 403. The in-canal section 403 is arranged on the enclosure 402 to be positioned between the first bend and the tympanic membrane (e.g., between the first and second bends) when the in-canal section 403 is fully deployed in the ear canal.

As is shown in FIGS. 4A and 4B, a wall 405 of the in-canal section 403 of the enclosure 402 includes an outer surface 407 configured to contact tissue 404 of the ear canal. The wall 405 of the in-canal section 403 also includes an inner surface 409 opposing the outer surface 407. The inner surface 409 of the wall 405 serves to form a portion of the shell interior 406. The in-canal section 403, as well as other portions of the enclosure 402, can comprise any suitable material including rigid, semi-rigid, or resilient materials. Suitable materials for the in-canal section 403 and other portions of the enclosure 402 include silicone, urethanes, or soft photopolymers.

The trough 410 defines a recess in the interior surface 409 of the enclosure 402. In some implementations, the trough 410 is a thinned section of the enclosure 402 with a recess in the interior surface 409 and a recess in the outer surface 407 of the enclosure 402. The trough 410 can be formed during molding or forming of the shell 402. Alternatively, some or all of the trough 410 can be formed post-manufacturing of the shell 402. For purposes of illustration and not of limitation, the trough 410 can have a depth of about half of the shell thickness. In some implementations, the depth of the trough 410 can range from a skim coating (e.g., ~50 μm to ~100 μm) to the temperature sensor 420 being located on the inside surface of shell (~1 mm). The trough 410 can have a length of about 3 mm to about 10 mm, and a width of about 0.5 mm to about 3 mm.

In implementations that include a recess in the outer surface 407 of the enclosure 402, the dimensions of this outer surface recess can be the same or different from that of the inner surface recess. For example, the outer surface recess can have a depth which is a fraction (e.g., about 20% to about 80%) of the inner surface recess. After completing installation of the temperature sensor 420 in the trough 410, a biocompatible material (e.g., shell material or biocompatible polymer/adhesive) can be dispensed into the outer surface recess (e.g., to fill the outer surface recess). It is understood that the dimensions of the trough 410 will vary depending on the configuration, materials, and thermal conductivity properties of the in-canal section 403 of the electronic device.

The trough 410 is dimensioned to receive a temperature sensor 420. The temperature sensor 420 is situated at the bottom surface 416 of the trough 410 and between opposing sides 412 of the trough 410. The trough 410 provides for a reduced amount of shell material between the temperature sensor 420 and tissue 404 of the ear canal. This reduction in the volume of shell material results in a concomitant reduction in thermal resistivity between the temperature sensor 420 and tissue 404 of the ear canal.

The temperature sensor 420 can be affixed to the bottom surface 416 using a biocompatible adhesive. In addition, or alternatively, one or more of notches, slots, and ledges can be provided at opposing sides 412 of the trough 410 and configured to support and/or constrain the temperature sensor 420 within the trough 410. FIG. 4C shows an implementation of a slot or notch 415 provided in the sides 412 of the trough 410 and configured to receive a peripheral edge of the flexible PCB 421. FIG. 4D shows an implementation of a ledge 417 extending from the sides 412 of the trough 410 and configured to engage/support the peripheral edge of the flexible PCB 421 and to prevent positional movement of the PCB 421. After the temperature sensor 420 is installed in the trough 410, a biocompatible material 419 (e.g., shell material, a biocompatible polymer/adhesive) can be dispensed into the outer surface recess (e.g., to fill the outer surface recess).

According any of the embodiments disclosed herein, the trough 410 and the flexible PCB 421 are configured to positionally stabilize the distal and proximal temperature sensors 422, 424 so as to maintain a consistent spacing, S, therebetween while the in-canal section 403 is deployed in the ear-canal. The trough 410 and the flexible PCB 421 are configured to facilitate consistent thermal contact between the distal and proximal temperature sensors 422, 424 and ear-canal tissue while deployed in the ear-canal. The spacing, S, between the distal and proximal temperature sensors 422, 424 ranges from about 2 mm to about 10 mm (e.g., from about 3 mm to about 9 mm, from about 4 mm to about 8 mm, such as about 6 or 7 mm).

As is shown in FIGS. 4A and 4B, and with the temperature sensor 420 disposed in the trough 410, components of the temperature sensor 420 can extend beyond the inner surface 409 of the shell 402 and into the shell interior 406. In some implementations, the temperature sensor 420 can be confined to the dimensions of the trough 410, such that no portion of the temperature sensor 420 extends beyond the inner surface 409 of the shell 402.

The temperature sensor 420 includes a flexible PCB 421 configured to support, and electrically communicate with, a number of components of the ear-wearable electronic device. The temperature sensor 420 includes a distal temperature sensor 422 and a proximal temperature sensor 424 each supported by, and electrically coupled to, the flexible PCB 421. A section 414 (e.g., a bridge) of the shell 402 can extend between the distal and proximal temperature sensors 422, 424 to provide support and positioning of the flexible PCB 421 in the trough 410 of the shell 402. Although two temperature sensors are shown in FIGS. 4A and 4B and other figures, it is understood that more than two temperature sensors can be disposed on, and electrically coupled to, the flexible PCB 421 (e.g., three, four, five, six temperature sensors).

According to any of the embodiments disclosed herein, the distal and proximal temperature sensors 422, 424 can be thermistors. Thermistors offer a low cost, low power, small form factor solution which enables a continuously-worn ear-wearable electronic device, such as a hearing aid, other type of personal amplification device or biometric/physiologic monitoring device. Various types of thermistors can be incorporated into the ear-wearable electronic devices of the present disclosure. Preferred thermistors are those having a negative temperature coefficient (NTC), although those having a positive temperature coefficient (PTC) can be used in some implementations.

For example, the distal and proximal temperature sensors 422, 424 can be implemented as glass encapsulated thermistors which includes a chip (e.g., a negative temperature coefficient (NTC) chip) encapsulated within a bead of glass. Leads (e.g., dumet leads) can be coupled to the chip and to other circuitry via the flexible PCB 421. In some implementations, the distal and proximal temperature sensors 422, 424 can be implemented as SMD (surface mount device) thermistors, which can be used for temperature sensing alone or in combination with other types of thermistors or temperature sensors. Other temperature sensors can be used in an ear-wearable electronic device of the present disclosure, including thermocouples, resistance temperature detectors (RTDs), digital thermistors, and other types of resistance temperature sensors. An ear-wearable electronic device of the present disclosure can incorporate any or a combination of these and other types of temperature sensors. For example, passive thermistors as small as 1.6 mm×0.8 mm×0.8 mm that only require one additional resistor can be used, which are particularly useful for incorporation in an in-canal hearing device.

In an ear-wearable electronic device that incorporates a thermistor, the leads or contacts of the thermistor are coupled to an analog-to-digital converter (ADC) and a processor or other logic device. The ADC and processor can be electrically coupled to the temperature sensor 420 disposed in the trough 410, but be located elsewhere in the shell interior 406. In some implementations, one or both of the ADCs and the processor or logic device can be located on the flexible PCB 421. Changes in thermistor resistance correspond to changes in temperature. Thermistor resistance can be converted to temperature by the processor using the well-known Steinhart-Hart equation (e.g., via a lookup table). The Steinhart-Hart equation is considered the best mathematical expression for the resistance-temperature relationship of NTC thermistors. The coefficients of the Steinhart-Hart equation vary with thermistor type and are typically provided by the manufacturer or readily derivable.

The flexible PCB 421 includes an arrangement of power and signal traces configured to interface with biasing and signal contacts of the distal and proximal thermistors 422, 424. The flexible PCB 421 is operatively coupled to power control management circuitry of the ear-wearable electronic device, which typically includes a rechargeable power source. A processor or controller of the ear-wearable electronic device can be configured to operate the distal and proximal thermistors 422, 424 on a "continuous basis."

It is understood that the term "continuous basis" in the context of operating the temperature sensor 420 refers to sampling temperature of in-canal tissue multiple times during each hour of a 24 hour day. It is understood that digitally sampling temperature involves sampling an analog temperature signal at discrete moments in time as part of the analog-to-digital conversion (ADC) process, which is commonly understood to constitute continuous temperature sampling. Continuous temperature sampling can refer to obtaining temperature readings at a rate dictated by the ADC process of the ear-wearable ADC electronics. Continuous temperature sampling can also refer to obtaining temperature readings at least once and preferably multiple times during each hour of a 24 hour day. For example, continuous temperature detection can refer to sampling temperature once every n minutes on a continuous basis (e.g., around the clock), where n can be any integer between 1 and 120 for each hour of a 24 hour day (e.g., once per hour, twice per hour, six times per hour, 12 times per hour, 30 times per hour, 60 times per hour, 120 times per hour).

Figure 5A:
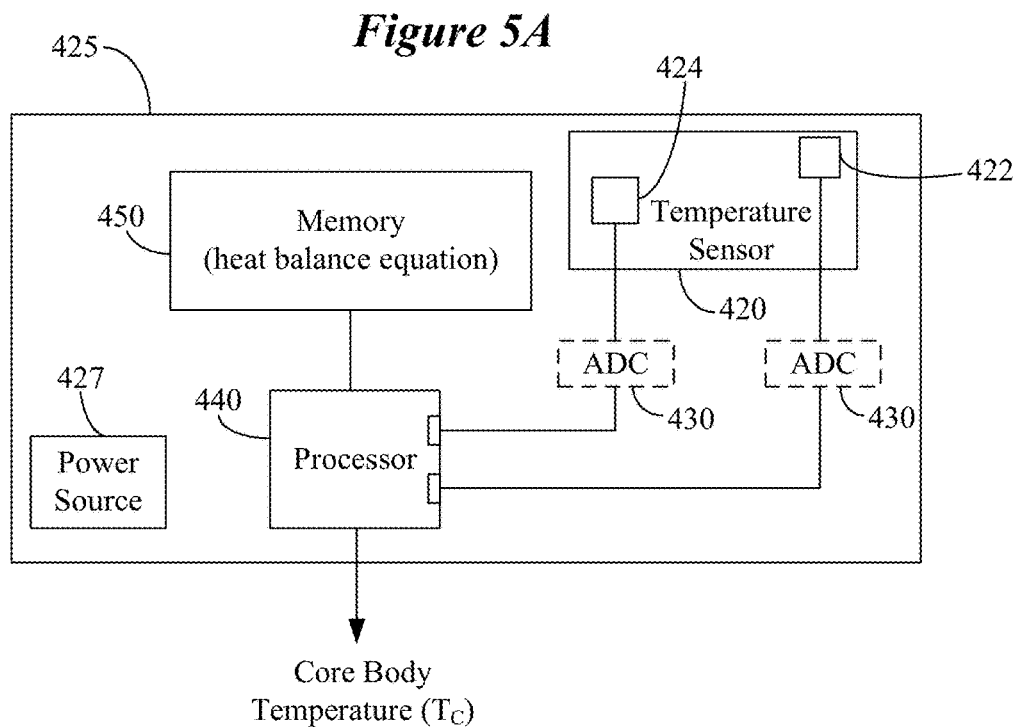
FIG. 5A is a block diagram of electronic circuitry of an ear-wearable electronic device configured to measure core body temperature, Tore, in accordance with any of the embodiments disclosed herein.

With continued reference to FIGS. 4A-4B and to FIG. 5A, temperature sensing circuitry 425 of the ear-wearable electronic device includes the temperature sensor 420, ADCs 430, a power source 427 (e.g., a rechargeable battery), and a processor or controller 440 coupled to a memory 450. The ADCs 430 can be integral to the temperature sensor 420 (e.g., digital thermistors) or the processor/controller 440. The memory 450 is configured to store a heat balance equation. The processor 440 is configured to calculate a core body temperature using the heat balance equation and temperature signals produced by the distal and proximal temperature sensors 422, 424. A representative heat balance equation is as follows:

$$T\_calc = (T\_inner - T\_outer - offset)/slope + T\_inner \qquad (1)$$

where, T_calc refers to core body temperature, T_inner refers to the temperature measured by the distal temperature sensor 422, T_outer refers to the temperature measured by the proximal temperature sensor 424, offset is an empirical constant determined through experimentation that produces the most accurate T_calc, and slope is an empirical constant determined through experimentation that produces the most accurate T_calc. In some implementations, the offset can be a constant for an entire population. In other implementations, the offset can be individualized to produce an even more accurate value of T_calc. For example, one approach can involve a combination of geometrical measurements made on the ear canal mold impression for a particular individual, and on the ear canal itself, as well use of autocalibration techniques.

The temperature sensing circuitry 425 is configured to measure temperature from within the ear canal and to calculate core body temperature, $T_{core}$, on a continuous basis in accordance with any of the embodiments disclosed herein. The distal temperature sensor 422 is configured to be located within the ear canal at a location between the first bend (or at/near the first bend) and the tympanic membrane (e.g., at or near a location of the tragus-side of the ear canal between the first and second bends). The proximal temperature sensor 424 is configured to be positioned at a location spaced apart from the distal temperature sensor 422 and proximal to the distal temperature sensor 422 in an outer ear direction. In some implementations, each of the distal and proximal temperature sensors 422, 424 is positioned between the first bend and the second band when the in-canal section 403 is fully deployed in the ear canal. In other implementations, the distal temperature sensor 422 is situated between the second band and the tympanic membrane, and the proximal temperature sensor 424 is situated between the first bend in the second band when the in-canal section 403 is fully deployed in the ear canal. In further implementations, each of the distal and proximal temperature sensors 422, 424 is positioned between the second band and the tympanic membranes.

Figure 5B:
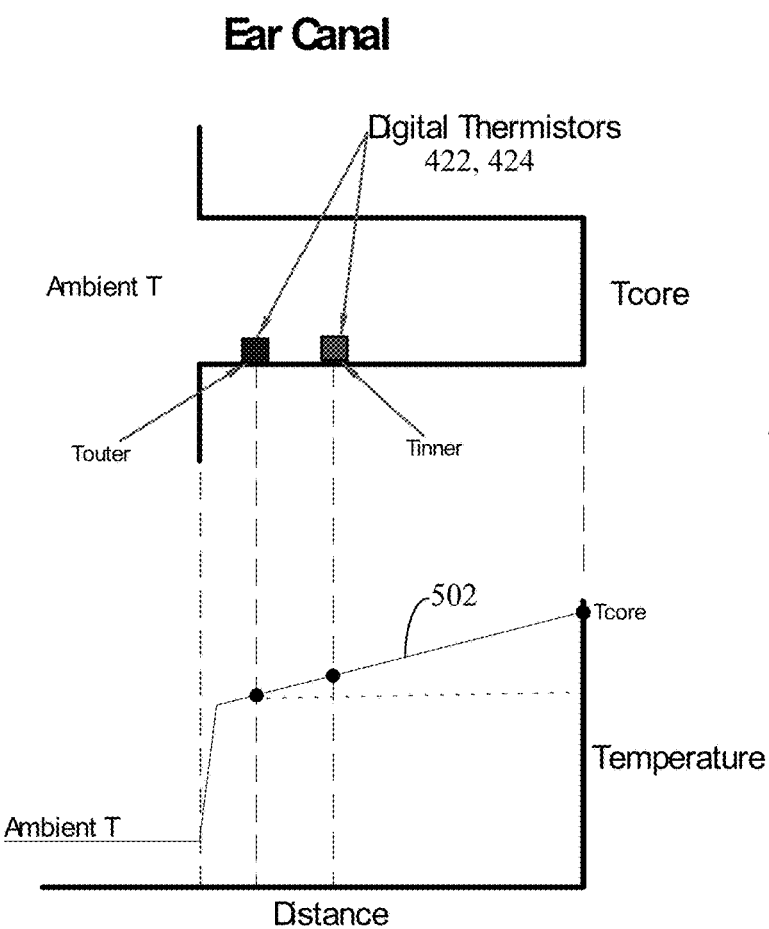
FIG. 5B graphically illustrates a method for computing core body temperature of a wearer of an ear-wearable electronic device in accordance with any of the embodiments disclosed herein.

FIG. 5B graphically illustrates a method implemented by the processor 440 for computing core body temperature, $T_{core}$, of a wearer of an ear-wearable electronic device of the present disclosure. The processor 440 is operatively coupled to the distal and proximal sensors 422, 424, and configured to calculate a thermal gradient 502 using signals (e.g., $T_{inner}$, $T_{outer}$) produced by the distal and proximal sensors 422, 424. The processor 440 is configured to extrapolate a core body temperature, $T_{core}$, using the thermal gradient.

A modified form of the equation above can be used which utilizes the effective flexible circuit board length via a residual canal length measurement made using an audiometer (e.g., the length from the hearing device tip to the tympanic membrane). Based on similar triangles as that shown in FIG. 5B, the $T_{inner}/T_{outer}$ difference temp, the effective flex circuit board length (e.g., the cosine of canal to faceplate angle), and the residual canal length measurement from the audiometer (e.g., stored in the device memory), $T_{core}$ can be solved directly.

A signal indicative of the core body temperature, $T_{core}$, is provided at an output of the processor 440. The processor 440 may be configured to generate one or more alerts based on a comparison between temperature measurements and one or more thresholds. For example, the processor 440 can be configured to compute the following temperature measurements: core body temperature continuously; 2) an increase in core body temperature over baseline at any given time of day; 3) a magnitude of variation in core body temperature over any specified time interval within or up to one day (diurnal, nocturnal); and 4) phase shifted daily circadian rhythm compared to normal. A threshold can be established for these and other temperature measurements computed by the processor 440. The processor 440 can be a multi-core processor, a digital signal processor (DSP) or a processor incorporating a DSP, a DSP or processor incorporating or coupled to an audio process, and ASIC, or a digital logic device, for example. The memory 450 can be Flash, ferroelectric RAM (FRAM), magnetoresistive RAM (MRAM), and other types of non-volatile memory, for example. The processor 440 can also incorporate or be coupled to volatile memory, such as RAM.

The processor 440 can communicate temperature measurements and related alerts in various ways (e.g., via a wireless or wired communication link). Temperature readings and related alerts can be communicated to the user through audio messages, if there is no wireless data communication channel present in the ear-wearable electronic device. Temperature readings and related alerts can be transferred to a computer or other device through a base station when recharging or changing batteries of the ear-wearable electronic device. The ear-wearable electronic device may include Bluetooth® and/or other wireless radios (e.g., IEEE 802.11 compliant radios, near-field communications (NFC) devices) for communicating with external electronic devices.

FIGS. 6A and 6B illustrate different configurations of the trough 410a, 410b and temperature sensor 420a, 420b disposed in the trough 410a, 410b in accordance with any of the embodiments disclosed herein. FIGS. 6A and 6B illustrate a portion of the in-canal section 403 of an ear-wearable electronic device, which includes the temperature sensor 420a, 420b disposed in the trough 410a, 410b, a sound port 460, and a vent port 462.

Referring to FIG. 6A, the trough 410a defines a substantially straight recessed portion of the in-canal section 403 of the shell 402. In the configuration shown in FIG. 6A, the trough 410a and the flexible PCB 421 have a polygonal shape, such as a rectangle. In this configuration, the distal and proximal temperature sensors 422, 424 are axially aligned relative to one another (e.g., they have an in-line relationship along the longitudinal axis of the in-canal section 403). In the configuration shown in FIG. 6A, the longitudinal axis of the in-canal section 403 of the shell 402 is substantially co-parallel with the longitudinal axis of the trough 410a/temperature sensor 420a. FIG. 6A-1 shows a variation of the trough 410a/temperature sensor 420a orientation, in which the longitudinal axis of the trough 410/temperature sensor 420 is oriented at an oblique angle relative to the longitudinal axis (e.g., determined empirically) of the in-canal section 403 (see discussion regarding FIGS. 7A-7C).

In other configurations, and as shown in FIG. 6B, all or a portion of the trough 410b/temperature sensor 420b is oriented at an angle relative to the longitudinal axis of the in-canal section 403, such that the angle changes (increases or decreases) as a function of position along the longitudinal axis of the in-canal section 403. In such configurations, all or a portion of the flexible PCB 421 is oriented at an angle relative to the longitudinal axis of the in-canal section 403. For example, and as shown in FIG. 6B, the trough 410b and temperature sensor 420b are curved such that at least a portion of a longitudinal axis of the curved trough 410b/420b is oriented off-axis relative to the longitudinal axis of the in-canal section 403. The curved trough 410b/temperature sensor 420b can have a simple curve, such as that shown in FIG. 6B, or a complex curve, such as an S-shaped, J-shaped or U-shaped curve (or a combination of these or other complex curves).

FIG. 6C illustrates positional freedom of the distal and proximal temperature sensors 422, 424 relative to tissue of the ear canal in accordance with any of the embodiments disclosed herein. FIG. 6C shows a significant amount of positional freedom that can be achieved using a temperature sensor 420 of the present disclosure. As shown, the proximal temperature sensor 424 is positioned within the ear canal facing more toward the tragus relative to the positioning of the distal temperature sensor 422. FIG. 6C shows a configuration in which the distal and proximal temperature sensors 422, 424 are radially offset from one another in addition to being axially offset. It is noted that, in some configurations, the distal and proximal temperature sensors 422, 424 are radially offset from one another, but need not be axially offset from one another.

Figure 6D:
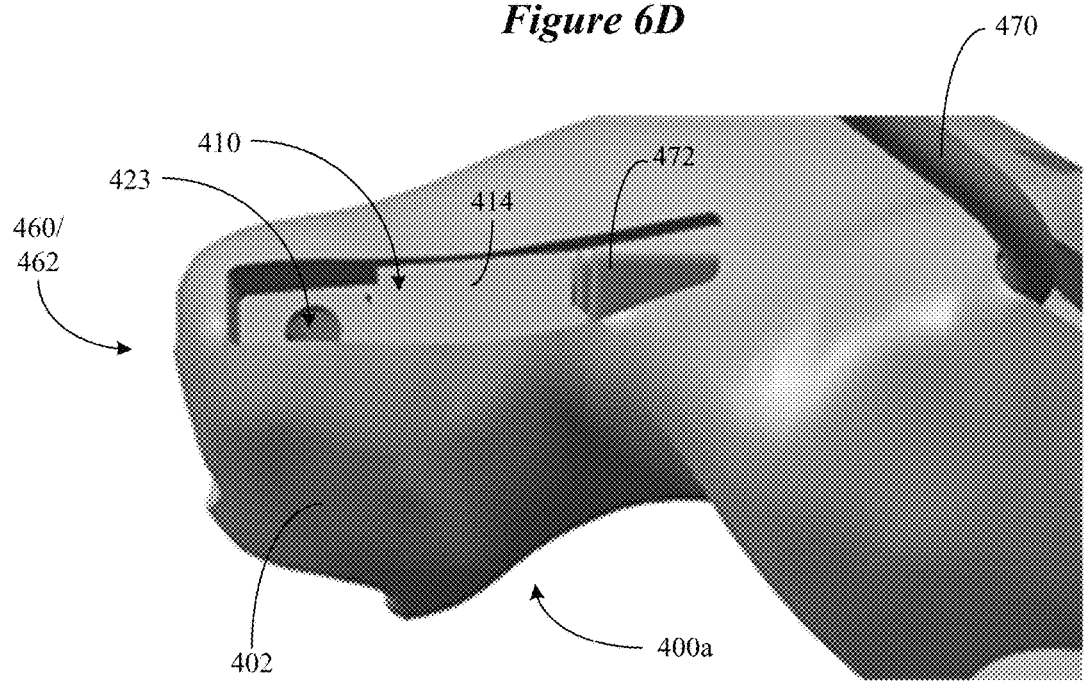
FIGS. 6D and 6E are three-dimensional renderings of an in-canal device which incorporates a temperatures sensor arrangement disposed in a trough in accordance with any of the embodiments disclosed herein.
Figure 6E:
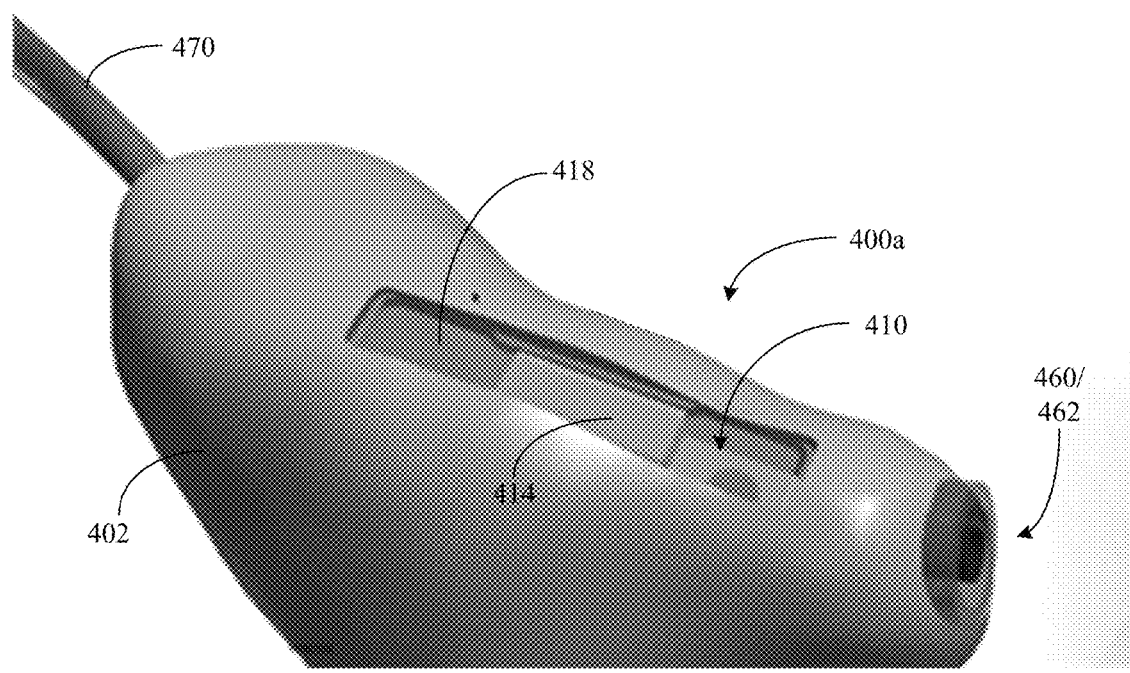

FIGS. 6D and 6E are three-dimensional renderings of an in-canal device (e.g., custom RIC device) 400a configured to incorporate a temperature sensor arrangement disposed in a trough in accordance with any of the embodiments disclosed herein. The in-canal device 400a includes an enclosure or shell 402 which comprises a trough 410 extending axially along at least a portion of the shell 402. The shell 402 has a unique, organic shape that corresponds to the unique shape/geometry of the wearer's ear canal. The trough 410 is arranged on the shell 402 to be positioned between the first bend and the tympanic membrane (e.g., between the first and second bends) when the in-canal device 400a is fully deployed in the ear canal. Although the trough 410 is shown to be a relatively straight rectangular structure in FIGS. 6D and 6E, the trough 410 can have a simple or complex curvature in the axial direction and be rotated relative to a longitudinal axis of the device 400a to accommodate the unique canal geometry of a wearer of the device 400a.

The trough 410 defines a recess in the shell 402 and is shaped to receive a flexible PCB 421 that supports a temperature sensor 420 (not show in FIGS. 6D and 6E). The trough 410 is shown to include a bridge section 414 formed of shell material that supports the flexible PCB 421. The flexible PCB 421 is tacked in place on the bridge section 414 with a suitable adhesive, and then skim-coated. Skim coating is a process in which the temperature sensor 420 is coated with a clear shell material 418, conforms to the ear anatomy, and is then cured. Skim coating provides protection of electronics from ear wax, moisture, and physical damage.

Placement of temperature sensor 420 in the trough 410 of the shell 402 allows the flexible PCB 421 to be curved to conform to the wearer's ear canal. The flex-based mounting of the temperature sensor 420 enables individual temperature sensors 420a-420n to be placed a specified distance apart (with tolerance) and at a consistent recess depth, but also be flush with the shell's outer wall. The organic sculpting of the shell 402 ensures that the temperature sensor placement will be close to the canal wall as possible. This arrangement maintains the consistent distance between temperature sensors 420a, 420b to provide an accurate gradient. The accurate gradient, where each temperature sensor 420a, 420b maintains a specified temperature performance (e.g., T±0.5 degrees), allows the device 400 to produce accurate core body temperature measurements.

FIGS. 6D and 6E show a cable 470 that enters the interior of the shell 402 via a slot in the shell 402. A connector 472 is disposed on the terminal end of the cable 470 to facilitate connectivity with the flexible PCB 421. Typically, the flexible PCB 421 is connected to the cable 470 via the connector 472 prior to installation in the trough 410, and then advanced through an access port (not shown) and positioned within the trough 410. The flexible PCB 421 is then tacked into place via an adhesive. A glue well 423 can be included to take up excess adhesive during installation of the flexible PCB 421 in the trough 410.

According to various embodiments, the shape of the trough 410 and that of the temperature sensor 420 can be adapted to conform to the shape of an individual's ear canal. FIG. 7A illustrates an ideal ear canal 701 (right side) and a typical ear canal 703 (left side). The ideal ear canal 701 is substantially straight, while the typical ear canal 703 has an irregular, non-straight shape (e.g., one or more bends). In the ideal case, and as shown in FIG. 7B, the trough 410 and temperature sensor 420 can be oriented in alignment with the longitudinal axis of the in-canal section 403 of the ear-wearable electronic device. In the typical case, and as shown in FIG. 7C, the trough 410 and the temperature sensor 420 can be oriented in an off-axis relationship (e.g., skewed at an oblique angle) with respect to the longitudinal axis of the in-canal section 403 of the ear-wearable electronic device. The orientation (e.g., rotation) of the temperature sensor 420 shown in FIG. 7C allows for fitting more extreme canal angles (e.g., which can approach about 90 degrees in some patients). It is also possible to shorten the flexible circuit board length and place it in a rotated position. Most canals are angled to some degree, so determining the effective perpendicular length (cosine of canal angle to face plate) can enable a shorter, but rotated, flexible circuit board length to be used.

It is understood that various embodiments described herein may be implemented with any ear-wearable electronic device without departing from the scope of this disclosure. The devices depicted in the figures are intended to demonstrate the subject matter, but not in a limited, exhaustive, or exclusive sense. Ear-wearable electronic devices, such as hearables (e.g., personal amplification devices, earbuds), hearing aids, and hearing assistance devices, typically include an enclosure, such as a housing or shell, within which internal components are disposed. Typical components of an ear-wearable electronic device can include one or more of a digital signal processor (DSP), memory, power management circuitry, one or more communication devices (e.g., an RF radio, a near-field magnetic induction (NFMI) device), one or more antennas, one or more microphones, and a receiver/speaker, for example. Some ear-wearable electronic devices can incorporate a long-range communication device, such as a Bluetooth® transceiver or other type of radio frequency (RF) transceiver. A communication device (e.g., a radio or NFMI device) of an ear-wearable electronic device can be configured to facilitate communication between a left ear device and a right ear device of the ear-wearable electronic device.

Ear-wearable electronic devices of the present disclosure can incorporate an antenna arrangement coupled to a high-frequency radio, such as a 2.4 GHz radio. The radio can conform to an IEEE 802.11 (e.g., WiFi®) or Bluetooth® (e.g., BLE, Bluetooth® 4.2 or 5.0) specification, for example. It is understood that hearing devices of the present disclosure can employ other radios, such as a 900 MHz radio. Ear-wearable electronic devices of the present disclosure can be configured to receive streaming audio (e.g., digital audio data or files) from an electronic or digital source. Representative electronic/digital sources (e.g., accessory devices) include an assistive listening system, a TV streamer, a radio, a smartphone, a laptop, a cell phone/entertainment device (CPED) or other electronic device that serves as a source of digital audio data or other types of data files. Ear-wearable electronic devices of the present disclosure can be configured to effect bi-directional communication (e.g., wireless communication) of data with an external source, such as a remote server via the Internet or other communication infrastructure.

The term ear-wearable electronic device of the present disclosure refers to a wide variety of ear-wearable electronic devices that can aid a person with impaired hearing. The term ear-wearable electronic device also refers to a wide variety of devices that can produce optimized or processed sound for persons with normal hearing. Ear-wearable electronic devices of the present disclosure include hearables (e.g., earbuds) and hearing aids (e.g., hearing instruments), for example. Ear-wearable electronic devices include, but are not limited to ITE, ITC, CIC or IIC type hearing devices or some combination of the above. In this disclosure, reference is made to an "ear-wearable electronic device," which is understood to refer to a system comprising a single ear device (left or right) or both a left ear device and a right ear device.

Figure 8:
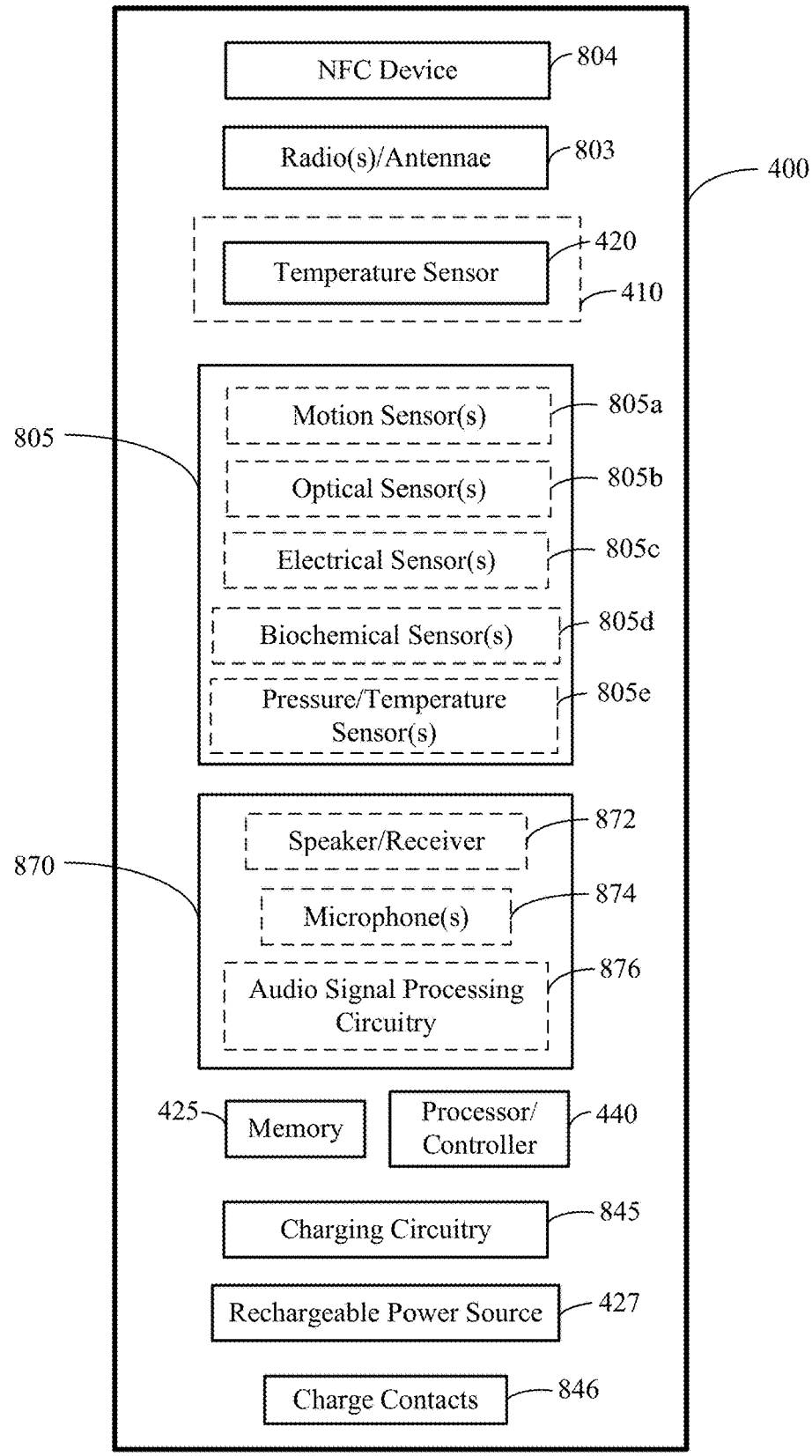
FIG. 8 is a block diagram of a representative ear-wearable electronic device which can incorporate a trough and a temperature sensor disposed therein in accordance with any of the embodiments disclosed herein.

FIG. 8 is a block diagram of a representative ear-wearable electronic device 400 which can incorporate a trough and a temperature sensor disposed therein in accordance with any of the embodiments disclosed herein. The device 400 is representative of a wide variety of electronic devices configured to be deployed in, on or about an ear of a wearer, including any of the devices discussed hereinabove. The device 400 can include an NFC device 804 (e.g., a NFMI device), and, additionally or alternatively, may include one or more RF radios/antennae 803 (e.g., compliant with a Bluetooth® or IEEE 802.11 protocol). The RF radios/antennae 803 can be configured to effect communications with an external electronic device, communication system, and/or the cloud. Data acquired by the ear-wearable electronic device 400 can be communicated to a smartphone, laptop, network server, and/or the cloud (e.g., a cloud server and/or processor). The device 400 includes a processor/controller 440, a rechargeable power source 427, charging circuitry 845, and charge contacts 846.

The device 400 includes a temperature sensor 420 disposed in a trough 410 as described hereinabove. The device 400 can also include one or more other sensors 805 (e.g., physiologic and non-physiologic sensor arrangements). For example, the device 400 can include one or more of a motion sensor 805a (an accelerometer, a gyro, an inertial measurement unit (IMU)), one or more optical physiologic and non-physiologic sensors 805b (e.g., a PPG sensor, pulse oximeter), one or more physiologic electrode-based sensors 805c (e.g., ECG, oxygen saturation (SpO2), respiration, EMG, EEG, EOG, galvanic skin response, electrodermal activity sensor), and one or more biochemical sensors 805d (e.g., glucose concentration, PH value, Ca+ concentration, hydration). Embodiments disclosed herein can incorporate one or more of the sensors disclosed in commonly-owned U.S. Patent Application Serial Nos. 63/125,700 filed Dec. 15, 2020 and 63/126,426 filed Dec. 16, 2020, both of which are incorporated herein by reference in their entireties.

In accordance with any of the embodiments disclosed herein, the device 400 can be configured as a hearing device or a hearable which includes an audio processing facility 870. The audio processing facility 870 includes sound generating circuitry and can also include audio signal processing circuitry 876 coupled to an acoustic transducer 872 (e.g., sound generator 130, speaker, receiver, bone conduction device) and optionally to one or more microphones 874 coupled to the audio signal processing circuitry 876. In other embodiments, the device 400 can be devoid of the one or more microphones 874. In further embodiments, the device 400 can be devoid of an audio processing facility 870, and be configured as an ear-wearable biometric sensor (e.g., a temperature sensor alone or in combination with any of the other sensors disclosed herein).

According to embodiments that incorporate the audio processing facility 870, the device 400 can be implemented as a hearing assistance device that can aid a person with impaired hearing. For example, the device 400 can be implemented as a monaural hearing aid or a pair of devices 400 can be implemented as a binaural hearing aid system, in which case left and right devices 400 are deployable with corresponding left and right wearable sensor units. The monaural device 400 or a pair of devices 400 can be configured to effect bi-directional communication (e.g., wireless communication) of data with an external source, such as a remote server via the Internet or other communication infrastructure. The device or devices 400 can be configured to receive streaming audio (e.g., digital audio data or files) from an electronic or digital source. Representative electronic/digital sources (e.g., accessory devices) include an assistive listening system, a streaming device (e.g., a TV streamer or audio streamer), a remote microphone, a radio, a smartphone, a laptop, a cell phone/entertainment device (CPED) or other electronic device that serves as a source of digital audio data, control and/or settings data or commands, and/or other types of data files.

The processor/controller 440 shown in FIG. 8 can include one or more processors or other logic devices. For example, the processor/controller 440 can be representative of any combination of one or more logic devices (e.g., multi-core processor, digital signal processor (DSP), microprocessor, programmable controller, general-purpose processor, special-purpose processor, hardware controller, software controller, a combined hardware and software device) and/or other digital logic circuitry (e.g., ASICs, FPGAs), and software/firmware configured to implement the functionality disclosed herein. The processor/controller 440 can incorporate or be coupled to various analog components (e.g., analog front-end), ADC and DAC components, and Filters (e.g., FIR filter, Kalman filter). The processor/controller 440 can incorporate or be coupled to memory. The memory can include one or more types of memory, including ROM, RAM, SDRAM, NVRAM, EEPROM, and FLASH, for example.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of" "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. An electronic device configured to measure temperature from within an ear canal having a first bend, a second bend, and a tympanic membrane, the device comprising:
   an enclosure comprising an in-canal section dimensioned for deployment in the ear canal, the in-canal section comprising a trough extending axially along at least a portion of the in-canal section and arranged to be positioned between the first bend and the tympanic membrane when the in-canal section is fully deployed in the ear canal; and
   a temperature sensor disposed in the trough and comprising:
      a flexible circuit board;
      a distal temperature sensor disposed on the flexible circuit board; and
      a proximal temperature sensor disposed on the flexible circuit board and situated proximal of, and spaced apart from, the distal temperature sensor in an outer ear direction.

2. The device of claim 1, wherein each of the distal and proximal temperature sensors is situated between the first bend and the second bend when the in-canal section is fully deployed in the ear canal.

3. The device of claim 1, wherein:
   the distal temperature sensor is situated between the second bend and the tympanic membrane when the in-canal section is fully deployed in the ear canal; and
   the proximal temperature sensor is situated between the first bend and the second bend when the in-canal section is fully deployed in the ear canal.

4. The device of claim 1, wherein:
   a wall of the in-canal section comprises an outer surface having a unique shape that uniquely conforms to a geometry of the wearer's ear canal; and
   the trough defines a recess in the outer surface.

5. The device of claim 1, comprising one or more of notches, slots, and ledges provided at opposing sides of the trough and configured to support the temperature sensor within the trough.

6. The device of claim 1, wherein:
   a wall of the in-canal section comprises an outer surface configured to contact tissue of the ear canal and an inner surface opposing the outer surface;
   the flexible circuit board comprises a first surface oriented toward the outer surface and a second surface oriented toward the inner surface; and
   the distal and proximal temperature sensors are mounted to the second surface of the flexible circuit board.

7. The device of claim 6, wherein the trough comprises a bridge section configured to support the flexible circuit board.

8. The device of claim 1, wherein material covers the temperature sensor and fills the trough.

9. The device of claim 1, wherein the trough defines a substantially straight recessed portion of the in-canal section, such that the distal and proximal temperature sensors are axially aligned relative to a longitudinal axis of the in-canal section.

10. The device of claim 1, wherein:
    the in-canal section has a longitudinal axis; and
    the trough and the temperature sensor are oriented at an angle relative to the longitudinal axis.

11. The device of claim 1, wherein the trough defines at least a partially curved recessed portion of the in-canal section, such that the distal and proximal temperature sensors are radially offset relative to one another.

12. The device of claim 1, wherein:
    the distal and proximal temperature sensors are positioned in the trough such that the distal and proximal temperature sensors are situated at a superior position in the ear canal when the in-canal section is fully deployed in the ear canal; or
    the distal and proximal temperature sensors are positioned in the trough such that the distal and proximal temperature sensors are situated at an anterior position in the ear canal when the in-canal section is fully deployed in the ear canal; or
    the distal temperature sensor is positioned in the trough such that the distal temperature sensor is situated at the superior position in the ear canal when the in-canal section is fully deployed in the ear canal, and the proximal temperature sensor is positioned in the trough such that the proximal temperature sensor is situated at the anterior position in the ear canal when the in-canal section is fully deployed in the ear canal.

13. The device of claim 1, wherein:
    the distal temperature sensor is configured to sense one or both of conductive heat and convective heat and to produce a first temperature signal; and
    the proximal temperature sensor is configured to sense one or both of the conductive heat and the convective heat and to produce a second temperature signal.

14. The device of claim 1, wherein each of the distal and proximal temperature sensors is configured to thermally couple to tissue of the ear canal.

15. The device of claim 1, wherein the trough and the flexible circuit board are configured to positionally stabilize the distal and proximal temperature sensors so as to maintain a consistent spacing therebetween while the in-canal section is deployed in the ear-canal.

16. The device of claim 15, wherein the spacing ranges from about 2 mm to about 10 mm.

17. The device of claim 15, wherein the spacing ranges from about 6 mm to about 8 mm.

18. The device of claim 1, wherein the trough and the flexible circuit board are configured to stabilize a location of the distal and proximal temperature sensors in the ear canal and to facilitate consistent thermal contact with ear-canal tissue while deployed in the ear-canal.

19. The device of claim 1, wherein the flexible circuit board comprises conductive traces configured to provide electrical connectivity between each of the distal and proximal temperature sensors and other circuitry of the device.

20. The device of claim 1, comprising:
a processor operatively coupled to the temperature sensor, the processor configured to calculate a core body temperature using a pre-established heat balance equation and signals produced by the first and proximal temperature sensors.

21. The device of claim 1, comprising a processor operatively coupled to the temperature sensor, the processor configured to:
calculate a thermal gradient using signals produced by the first distal and proximal temperature sensors; and
extrapolate a core body temperature using the thermal gradient.

22. A method implemented by an ear-wearable electronic device configured for deployment in an ear canal of an ear, the ear canal comprising a first bend, a second bend, and a tympanic membrane, the method comprising:
measuring, using a distal temperature sensor disposed in a trough of an enclosure of the device, a first temperature indicative of one or both of conductive heat and convective heat at a first location of the ear canal between the first bend and the tympanic membrane;
measuring, using a proximal temperature sensor disposed in the trough at a location proximal of the distal temperature sensor in an outer ear direction, a second temperature indicative of one or both of conductive heat and convective heat at a second location of the ear canal between the first and second bends;
receiving, from a memory of the device, a pre-established heat balance equation; and
calculating, using a processor of the device, a core body temperature using the pre-established heat balance equation and the first and second temperatures.

23. The method of claim 22, wherein measuring the first temperature comprises measuring, using the distal temperature sensor, the first temperature indicative of one or both of conductive heat and convective heat at a first location of the ear canal between the second bend and the tympanic membrane.

24. The method of claim 22, comprising performing the method on a continuous basis.

* * * * *